US011937001B2

(12) United States Patent
Mochizuki

(10) Patent No.: US 11,937,001 B2
(45) Date of Patent: Mar. 19, 2024

(54) SENSOR AND CONTROL METHOD

(71) Applicant: SONY SEMICONDUCTOR SOLUTIONS CORPORATION, Kanagawa (JP)

(72) Inventor: Futa Mochizuki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 262 days.

(21) Appl. No.: 17/309,647

(22) PCT Filed: Dec. 5, 2019

(86) PCT No.: PCT/JP2019/047538
§ 371 (c)(1),
(2) Date: Jun. 11, 2021

(87) PCT Pub. No.: WO2020/129657
PCT Pub. Date: Jun. 25, 2020

(65) Prior Publication Data
US 2022/0021829 A1 Jan. 20, 2022

(30) Foreign Application Priority Data

Dec. 19, 2018 (JP) .................................. 2018-236923

(51) Int. Cl.
*H04N 25/702* (2023.01)
*H04N 25/75* (2023.01)
*H04N 25/771* (2023.01)

(52) U.S. Cl.
CPC ........... *H04N 25/702* (2023.01); *H04N 25/75* (2023.01); *H04N 25/771* (2023.01)

(58) Field of Classification Search
CPC .... H04N 25/702; H04N 25/75; H04N 25/771; H04N 25/40
See application file for complete search history.

(56) References Cited

U.S. PATENT DOCUMENTS

2016/0344958 A1 11/2016 Kondo et al.
2018/0167575 A1* 6/2018 Watanabe ............ H04N 25/771

FOREIGN PATENT DOCUMENTS

WO 2015/115224 A1 8/2015
WO 2017/013806 A1 1/2017

OTHER PUBLICATIONS

International Search Report and Written Opinion of PCT Application No. PCT/JP2019/047538, dated Jan. 28, 2020, 08 pages of ISRWO.

(Continued)

*Primary Examiner* — Nhan T Tran
(74) *Attorney, Agent, or Firm* — CHIP LAW GROUP

(57) ABSTRACT

The present technology relates to a sensor that detects an event which is a change in electric signal of a pixel and a control method, with which it is possible to suppress a situation where an unnatural image is obtained. An event which is a change of an electric signal of a pixel that receives light and performs photoelectric conversion to generate the electric signal is detected, and the electric signal of the pixel is read according to a voltage change in a capacitance reset to a prescribed voltage, the change being based on the electric signal of the pixel. In this case, the electric signal of an event detection pixel, among the pixels, where the event has been detected and the electric signal of a peripheral pixel, among the pixels, disposed on the periphery of the event detection pixel are read. The present technology is applicable to a sensor for detecting an event which is a change of an electric signal of a pixel, for example.

9 Claims, 27 Drawing Sheets

(56) References Cited

OTHER PUBLICATIONS

Posch, et al., "A QVGA 143 dB Dynamic Range Frame-Free PWM Image Sensor with Lossless Pixel-Level Video Compression and Time-Domain CDS", IEEE Journal of Solid-State Circuits, vol. 46, No. 1, Jan. 2011, 17 pages.

* cited by examiner

FIG. 21
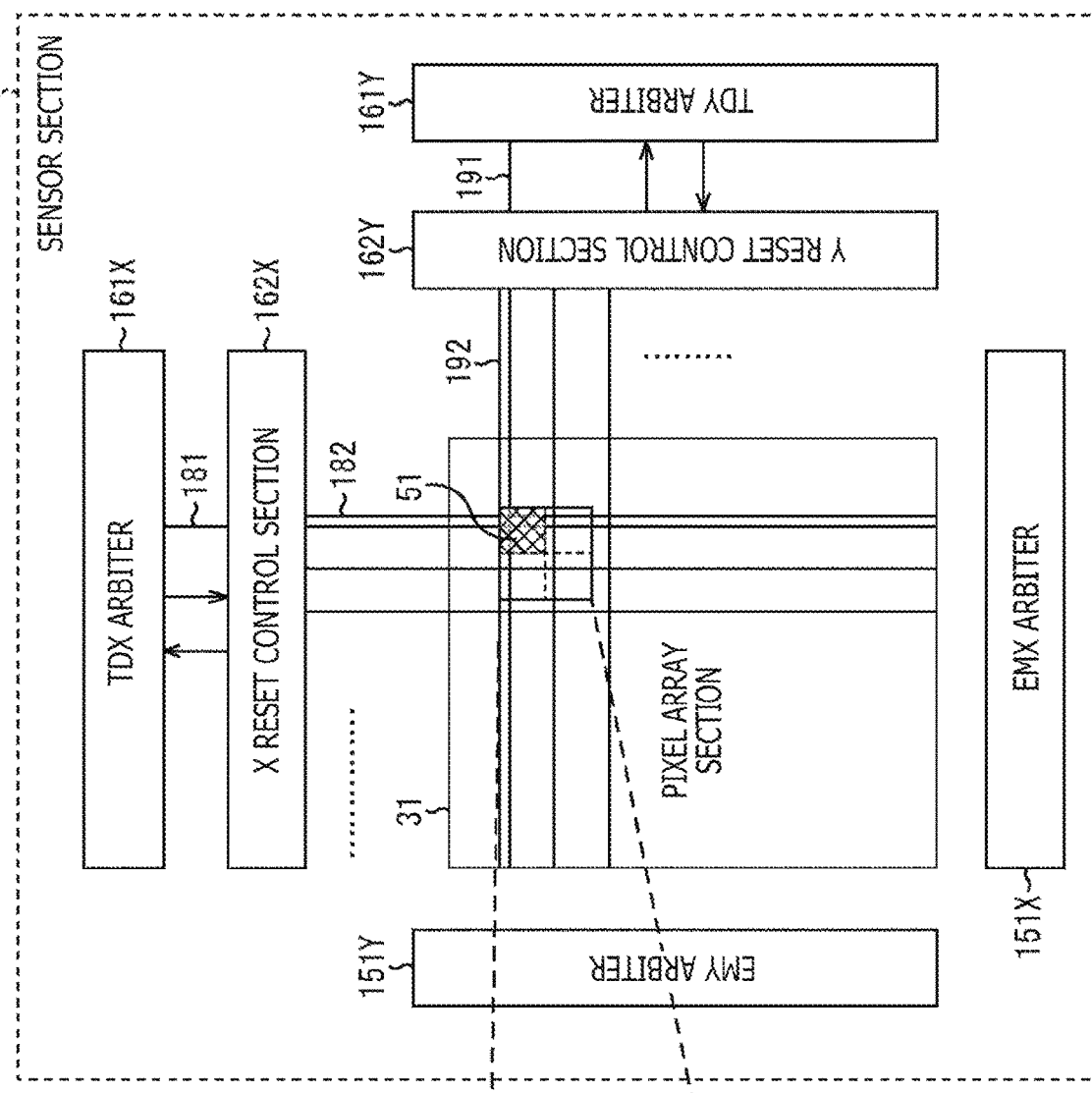
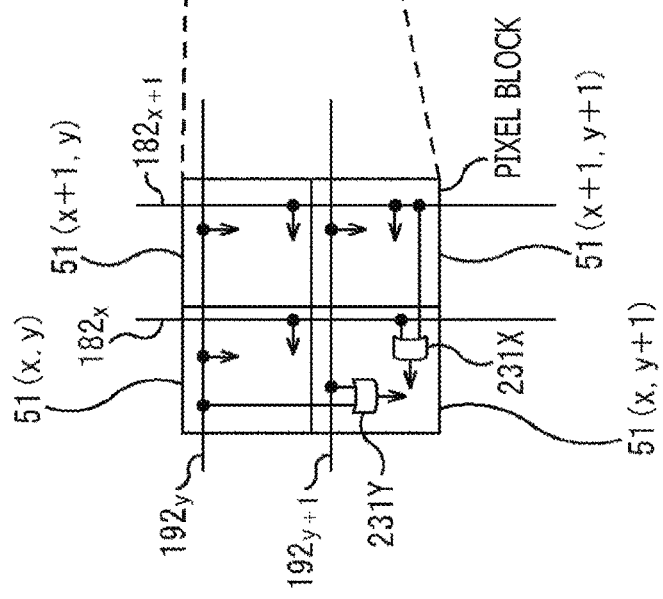

FIG. 23
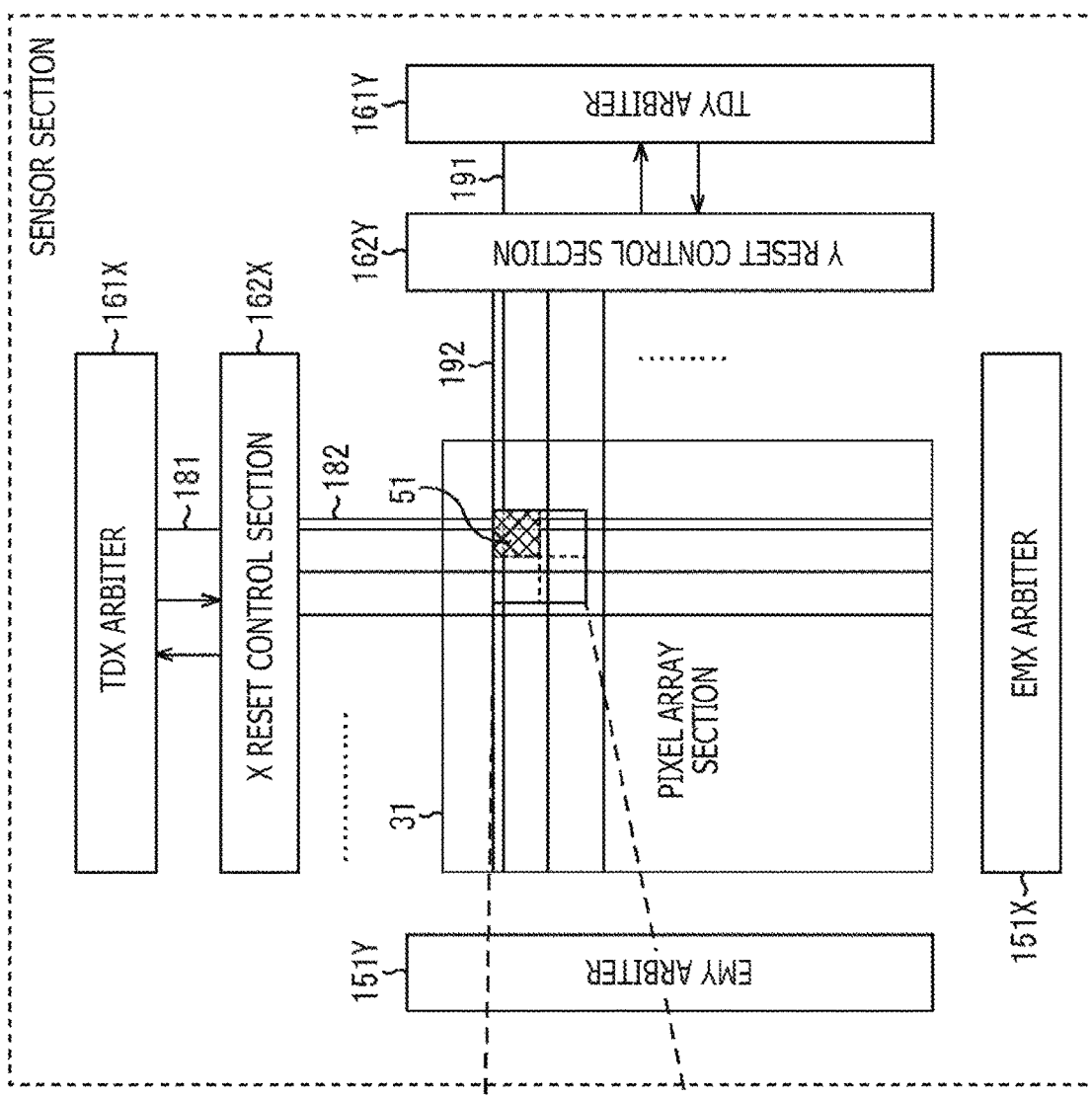
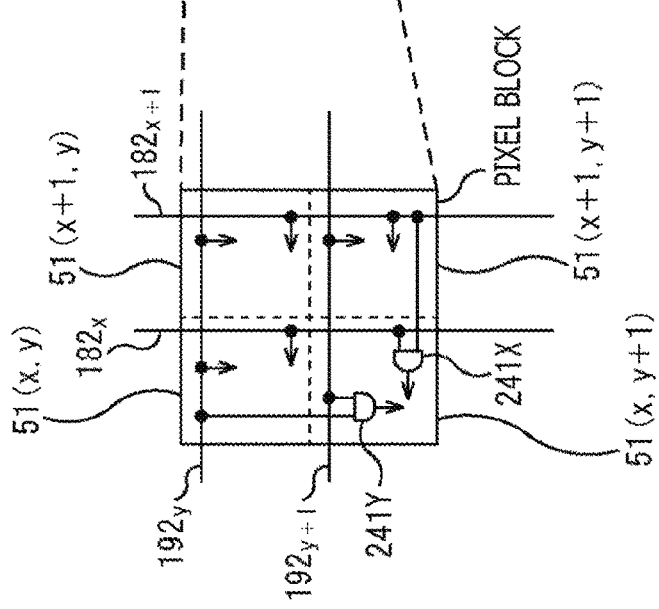

SENSOR AND CONTROL METHOD

CROSS REFERENCE TO RELATED APPLICATIONS

This application is a U.S. National Phase of International Patent Application No. PCT/JP2019/047538 filed on Dec. 5, 2019, which claims priority benefit of Japanese Patent Application No. JP 2018-236923 filed in the Japan Patent Office on Dec. 19, 2018. Each of the above-referenced applications is hereby incorporated herein by reference in its entirety.

TECHNICAL FIELD

The present technology relates to a sensor and a control method and particularly relates to, for example, a sensor that detects an event which is a change in electric signal of a pixel and a control method, with which it is possible to suppress a situation where an unnatural image is obtained.

BACKGROUND ART

There has been an image sensor proposed in which, in a case where an event which is a luminance change in a pixel occurs, the sensor detects the event, outputs event data indicating the occurrence of the event, and outputs a luminance signal of the pixel where the event has been detected (for example, see NPL 1).

Here, an image sensor that performs image capturing in synchronization with a vertical synchronous signal and outputs frame data which is image data of a frame format can be regarded as a synchronous image sensor. On the other hand, an image sensor that outputs event data can be regarded as an asynchronous image sensor because it does not output the event data in synchronization with any vertical synchronous signal. The asynchronous image sensor is called DVS (Dynamic Vision Sensor), for example.

CITATION LIST

Non Patent Literature

[NPL 1]
Christoph Posch, et. al, "A QVGA 143 dB Dynamic Range Frame-Free PWM Image Sensor with Lossless Pixel-Level Video Compression and Time-Domain CDS," IEEE JSSC, Vol. 46, No. 1, January, 2011

SUMMARY

Technical Problem

In DVSs, in a case where a luminance signal of a pixel where an event has been detected is outputted, an unnatural image may be obtained.

The present technology has been made in view of such circumstances and enables to suppress a situation where an unnatural image is obtained.

Solution to Problem

A sensor according to the present technology includes pixels that each receive light and perform photoelectric conversion to generate an electric signal, an event detection section that detects an event which is a change of the electric signal of a pixel, and a signal reading section that reads the electric signal of a pixel according to a voltage change in a capacitance reset to a prescribed voltage, the change being based on the electric signal of the pixel. The electric signal of an event detection pixel, among the pixels, where the event has been detected and the electric signal of a peripheral pixel, among the pixels, disposed on a periphery of the event detection pixel are read.

A control method according to the present technology is executed by a sensor that includes pixels that each receive light and perform photoelectric conversion to generate an electric signal, an event detection section that detects an event which is a change of the electric signal of a pixel, and a signal reading section that reads the electric signal of a pixel according to a voltage change in a capacitance reset to a prescribed voltage, the change being based on the electric signal of the pixel. The control method includes reading the electric signal of an event detection pixel, among the pixels, where the event has been detected and the electric signal of a peripheral pixel, among the pixels, disposed on a periphery of the event detection pixel.

In the sensor and the control method according to the present technology, an event which is a change of an electric signal of a pixel that receives light and performs photoelectric conversion to generate the electric signal is detected, and the electric signal of the pixel is read according to a voltage change in a capacitance reset to a prescribed voltage, the change being based on the electric signal of the pixel. In this case, the electric signal of an event detection pixel, among the pixels, where the event has been detected and the electric signal of a peripheral pixel, among the pixels, disposed on the periphery of the event detection pixel are read.

The sensor may be an independent device or may be an internal block included in one device. Further, the sensor can be formed as a module or a semiconductor chip.

BRIEF DESCRIPTION OF DRAWINGS

FIG. 21 is a diagram depicting a configuration example of the sensor section 21 in a case where the third reading method is adopted.

FIG. 23 is a diagram depicting a configuration example of the sensor section 21 in a case where the fourth reading method is adopted.

DESCRIPTION OF EMBODIMENTS

<One Embodiment of Sensor Chip to Which Present Technology is Applied>

Figure 1:
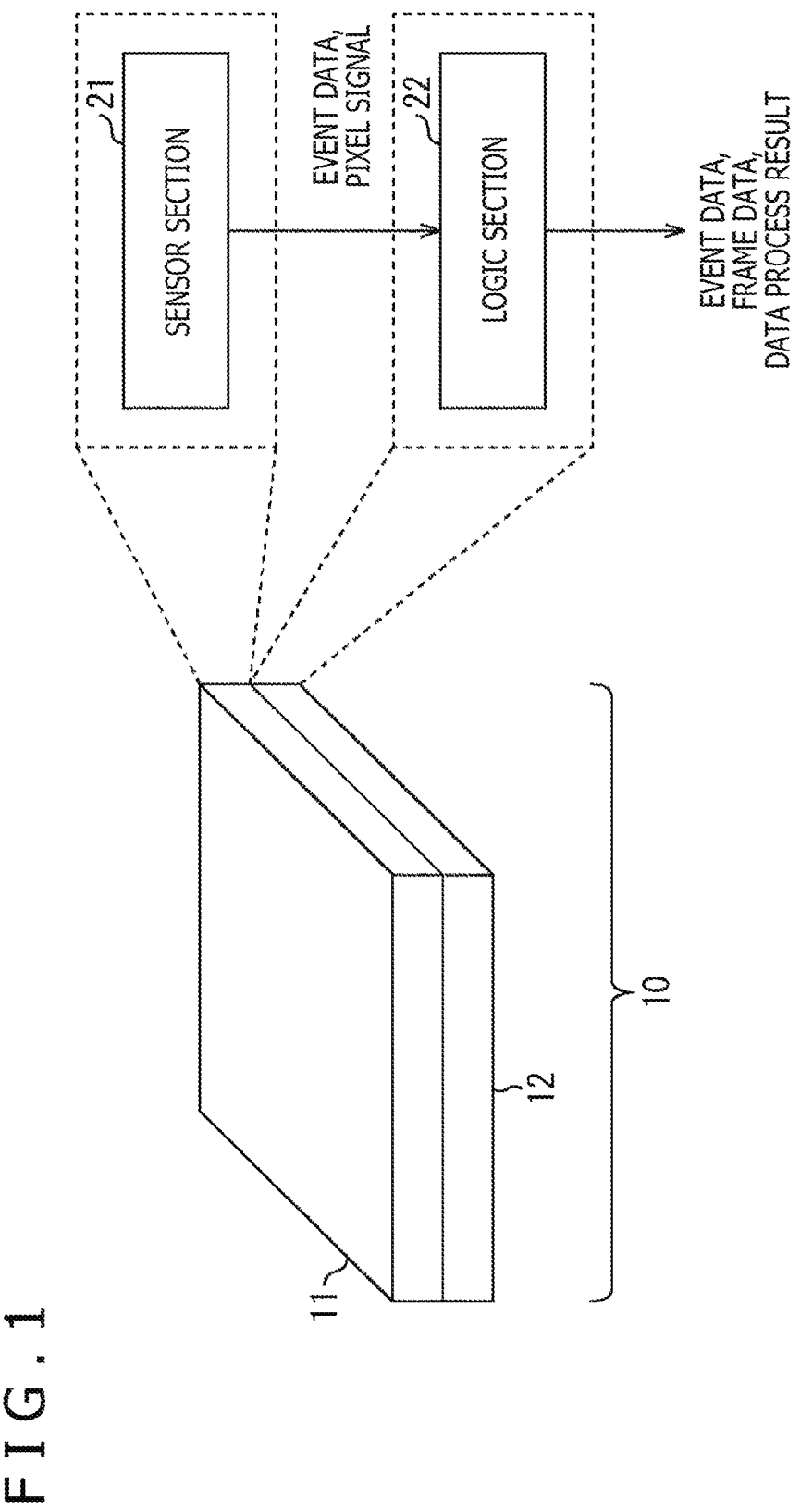
FIG. 1 is a diagram depicting a configuration example of one embodiment of a sensor chip to which the present technology is applied.

FIG. 1 is a diagram depicting a configuration example of one embodiment of a sensor chip to which the present technology is applied.

A sensor chip 10 is a one-chip semiconductor chip and is formed by layering, as a plurality of dies (substrates), a sensor die (substrate) 11 and a logic die 12. It is to be noted that the sensor chip 10 can include only one die or can include three or more layered dies.

In the sensor chip 10 in FIG. 1, a sensor section 21 (a circuit serving as the sensor section 21) is formed in the sensor die 11, and a logic section 22 is formed in the logic die 12. It is to be noted that a portion of the sensor section 21 can be formed in the logic die 12. Also, a portion of the logic section 22 can be formed in the sensor die 11.

The sensor section 21 includes pixels that each generate an electric signal by performing photoelectric conversion of incident light such that event data indicating occurrence of an event which is a change of an electric signal of a pixel is generated. The sensor section 21 supplies the event data to the logic section 22. That is, the sensor section 21 carries out image capturing to generate electric signals by photoelectric conversion of light incident on the pixels, but generates not image data in a frame format but event data indicating occurrence of an event which represents a change of an electric signal of a pixel. The sensor section 21 outputs, to the logic section 22, the event data obtained as a result of the image capturing.

A synchronous image sensor refers to an image sensor that carries out image capturing in synchronization with a vertical synchronous signal and outputs frame data which is image data of a frame format. The sensor section 21 can be regarded as not a synchronous image sensor but an asynchronous type (image sensor) because, when outputting event data, the sensor section 21 does not operate in synchronization with any vertical synchronous signal.

It is to be noted that, besides the event data, the sensor section 21 can generate and output frame data as in synchronous image sensors. Further, the sensor section 21 can output, together with the event data, an electric signal of a pixel where an event has occurred (a pixel where an event has been detected) as a pixel signal to be a pixel value of the pixel in the frame data.

The logic section 22 controls the sensor section 21 as needed. In addition, according to the event data from the sensor section 21, the logic section 22 executes various kinds of data processing including data processing for generating frame data and image processing on the frame data from the sensor section 21 or on frame data generated according to the event data from the sensor section 21 and outputs the data processing result obtained by processing of various kinds of data such as the event data and the frame data.

<Configuration Example of Sensor Section 21>

Figure 2:
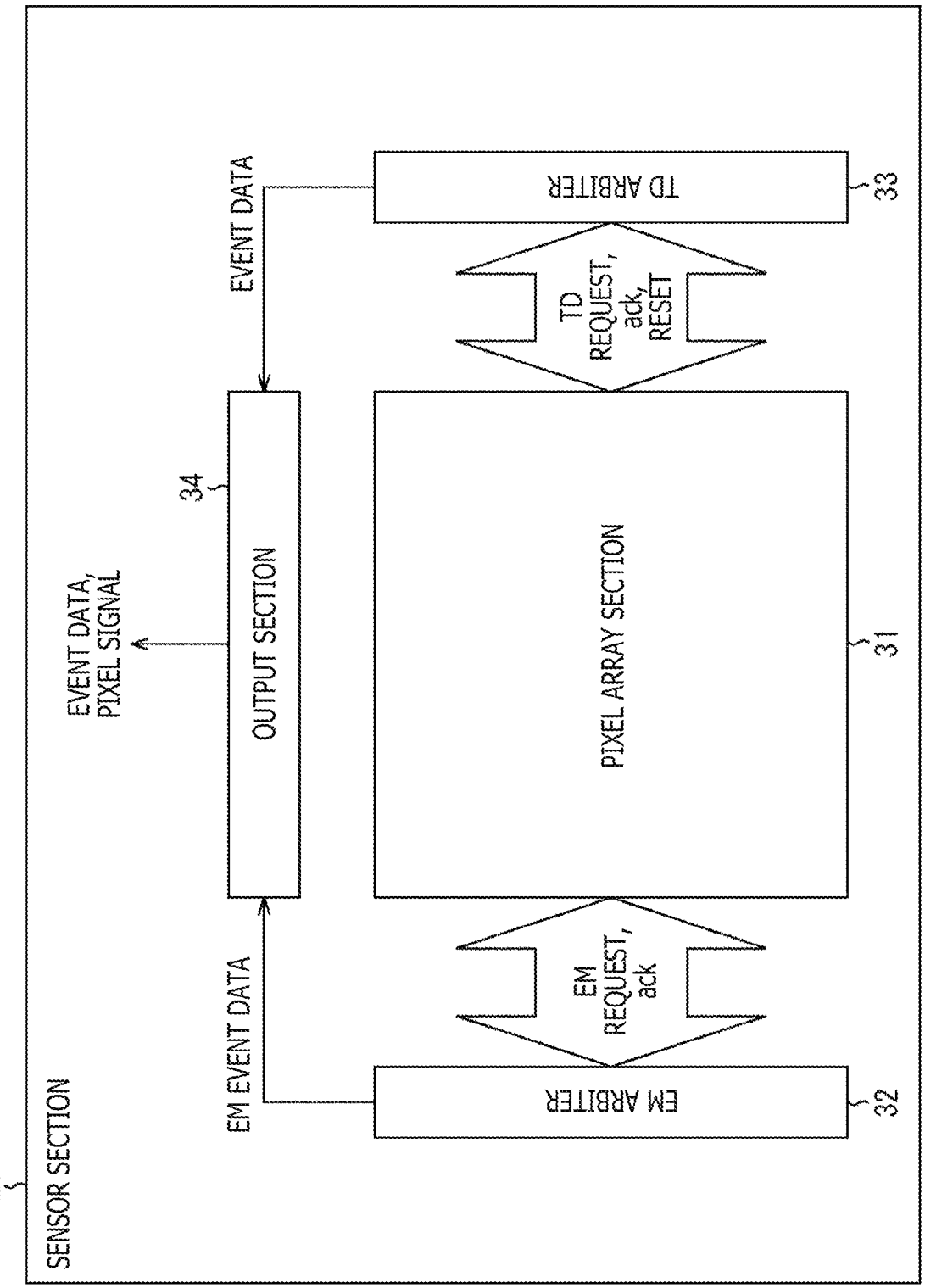
FIG. 2 is a block diagram depicting a configuration example of a sensor section 21.

FIG. 2 is a block diagram depicting a configuration example of the sensor section 21 in FIG. 1.

The sensor section 21 includes a pixel array section 31, an EM (Exposure Measurement) arbiter 32, a TD (Time Detector) arbiter 33, and an output section 34.

The pixel array section 31 includes a plurality of pixels (FIG. 3) arranged in a two-dimensional lattice shape. In a case where a change greater than a prescribed threshold (including a change equal to or greater than the threshold, as needed) occurs in photoelectric current which is an electric signal generated as a result of photoelectric conversion in any of the pixels 51, the pixel array section 31 detects the photoelectric current change as an event. In the case where the event is detected, the pixel array section 31 outputs to the TD arbiter 33 a TD request signal that is a request to output event data indicating occurrence of the event. Further, the pixel array section 31 receives from the TD arbiter 33 an ack (acknowledge) signal which indicates acknowledgement of output of the event data and receives a reset signal for resetting a capacitor 71 (FIG. 4) for reading an electric signal of the pixel 51 where the event has been detected or the like to a prescribed voltage. After receiving the reset signal, the pixel array section 31 starts reading the electric signal of the pixel 51 where the event has been detected and outputs to the EM arbiter 32 an EM request signal that is a request to output, as a pixel signal to be a pixel value, a signal according to the electric signal.

Here, a change in photoelectric current generated in any of the pixels 51 in the pixel array section 31 can be regarded as a light quantity change of light incident on the pixel 51. Accordingly, an event can be regarded as a light quantity change (a light quantity change greater than a threshold) in the pixel 51.

The EM arbiter 32 receives the EM request signal from the pixel array section 31, arbitrates the EM request signal as needed, and supplies the output section 34 with EM event data indicating that the EM request signal has been received. In addition, the EM arbiter 32 sends, back to the pixel array section 31, an ack signal in response to the EM request signal from the pixel array section 31.

The TD arbiter 33 receives the TD request signal from the pixel array section 31 and arbitrates as needed. Then, the TD arbiter 33 supplies (outputs), to the output section 34, event data indicating occurrence of the event, in response to the TD request signal. Further, the TD arbiter 33 sends, back to the pixel array section 31, an ack signal in response to the TD request signal and supplies a reset signal to the pixel array section 31, so that reading of the electric signal of the pixel 51 where the event has been detected is started.

The output section 34 generates, according to the EM event data from the EM arbiter 32, a pixel signal of the pixel 51 where the event has been detected and supplies (outputs) the pixel signal to the logic section 22.

In addition, the output section 34 causes the event data from the TD arbiter 33 to include clock-time information, such as a time stamp, indicating a (relative) clock time when the event occurred and positional information (e.g., coordinates) indicating a position of the pixel 51 where the light quantity change has occurred as an event (where the event has been detected) and supplies the resultant data to the logic section 22.

It is to be noted that the output section 34 can cause the event data to further include a polarity (positive/negative) of the light quantity change. As a data format of the event data including the positional information of the pixel 51 where the event has occurred (has been detected), the clock-time information indicating the clock time when the event occurred, and the polarity of the light quantity change as the event, a data format called AER (Address Event Representation) can be used, for example.

<Configuration Example of Pixel Array Section 31>

Figure 3:
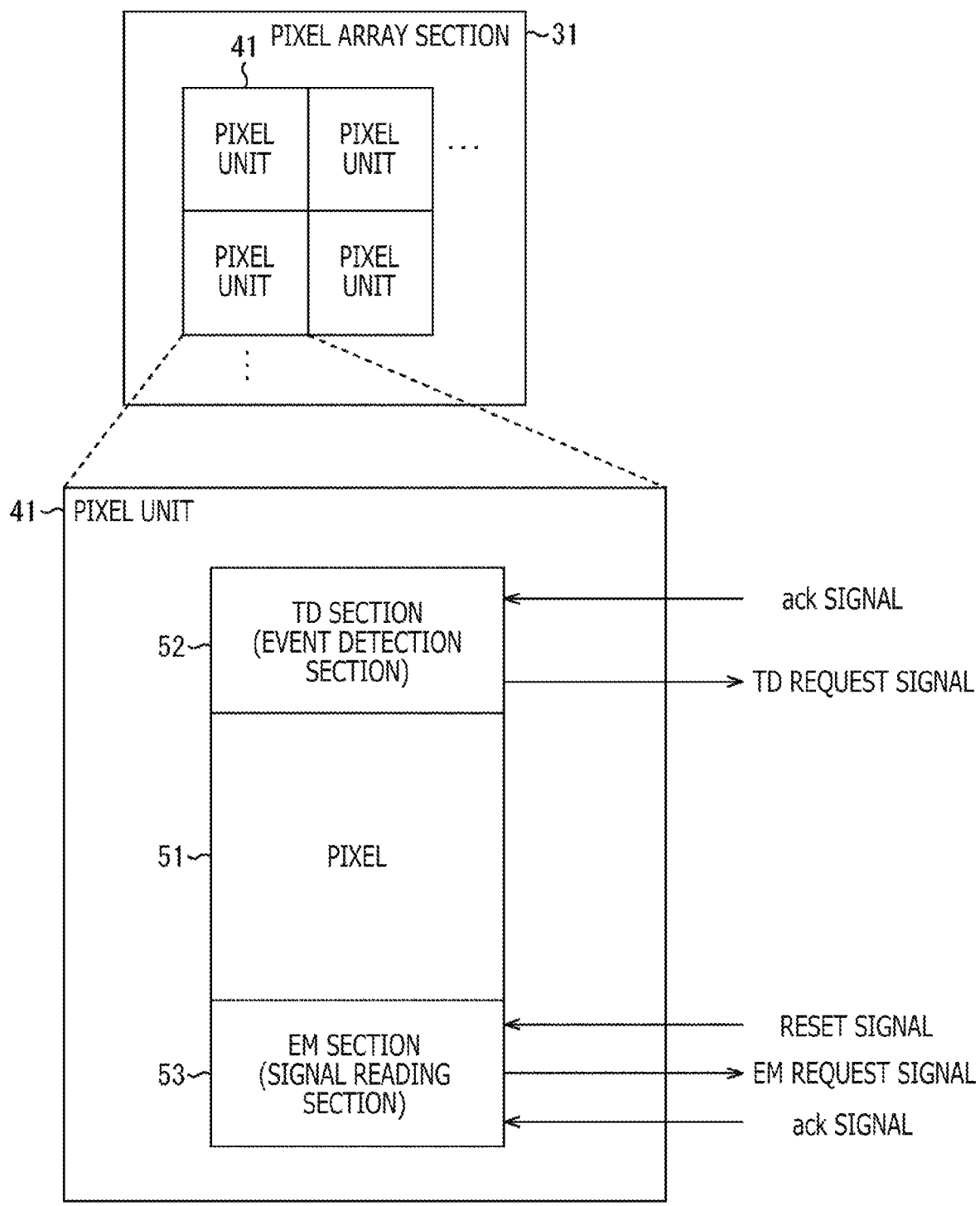
FIG. 3 is a block diagram depicting a configuration example of a pixel array section 31.

FIG. 3 is a block diagram depicting a configuration example of the pixel array section 31 in FIG. 2.

The pixel array section 31 includes a plurality of pixel units 41. The plurality of pixel units 41 is arranged in a two-dimensional lattice shape.

The pixel units 41 each include the pixel 51, a TD section 52, and an EM section 53.

The pixel 51 receives incident light from a subject and performs photoelectric conversion to generate photoelectric current in the form of an electric signal.

The TD section 52 functions as an event detection section that detects, as an event, a change greater than a prescribed threshold in photoelectric current in the pixel 51. In the case where an event is detected, the TD section 52 supplies the TD arbiter 33 (FIG. 2) with a TD request signal that is a request to output event data indicating occurrence of the event. The TD arbiter 33 supplies the output section 34 with the event data in response to the TD request signal and sends an ack signal back to the TD section 52 in response to the TD request signal. The TD section 52 receives the ack signal from the TD arbiter 33 and resumes detecting an event in the pixel 51.

The EM section 53 functions as a signal reading section that, in the case where an event is detected by the TD section 52, reads photoelectric current which is an electric signal of the pixel 51, in response to a reset signal from the TD arbiter 33. The EM section 53 supplies (outputs) an EM request signal to the EM arbiter 32 in response to the reading of the photoelectric current from the pixel 51. The EM arbiter 32 sends an ack signal back to the EM section 53 in response to the EM request signal. The EM section 53 receives the ack signal from the EM arbiter 32.

Here, detection of a change greater than the prescribed threshold in photoelectric current as an event can also be considered as detection of a situation in which there is no change greater than the prescribed threshold in photoelectric current as an event. The EM section 53 can read photoelectric current in the pixel 51 in the case where a situation in which there is no change greater than the prescribed threshold in photoelectric current is detected as an event, in addition to the case where a change greater than the prescribed threshold in photoelectric current is detected as an event.

<Configuration Examples of Pixel 51 and EM Section 53>

Figure 4:
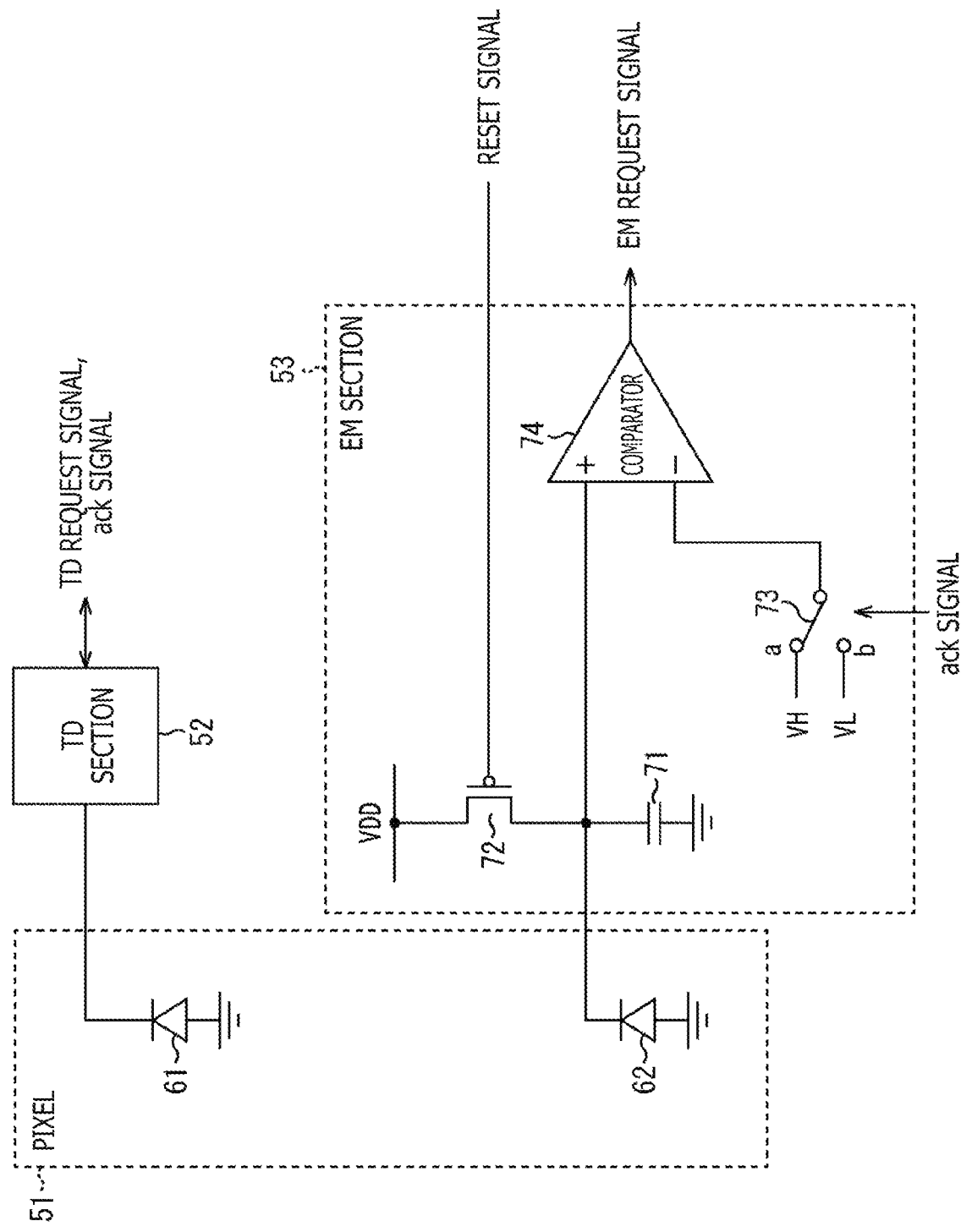
FIG. 4 is a circuit diagram depicting configuration examples of a pixel 51 and an EM section 53.

FIG. 4 is a circuit diagram depicting configuration examples of the pixel 51 and the EM section 53.

The pixel 51 incudes PDs (Photodiodes) 61 and 62 which are photoelectric conversion elements.

The PDs 61 and 62 receive incident light and perform photoelectric conversion to generate an electric charge. Movement, in the PDs 61 and 62, of the electric charge generated by the photoelectric conversion causes photoelectric current to flow (to be generated).

The PD 61 is connected to the TD section 52. The photoelectric current of the PD 61 flows to the TD section 52 and is used by the TD section 52 to detect an event.

The PD 62 is connected to the EM section 53. The photoelectric current in the PD 62 is read by the EM section 53 (flows to the EM section 53) and is used to generate a pixel signal.

Here, the PDs 61 and 62 can be implemented by one PD. That is, while the pixel 51 of the present embodiment includes the two PDs 61 and 62, the pixel 51 can be formed by one PD. In the case where the pixel 51 is formed by one PD, the one PD is connected to the TD section 52 and the EM section 53.

The EM section 53 includes a capacitor 71 as a capacitance, an FET 72, a switch 73, and a comparator 74.

One end of the capacitor 71 is grounded, and another end thereof is connected to a drain of the FET 72. The connection point between the capacitor 71 and the FET 72 is connected to the PD 62 (a cathode of the PD 62) and to a non-inverted input terminal of the comparator 74. Therefore, a voltage of the capacitor 71 is supplied to the non-inverted input terminal of the comparator 74.

The FET 72 is a P (Positive)-type MOS (Metal-Oxide-Semiconductor) FET (Field Effect Transistor) and has a source connected to a power source VDD. A reset signal from the TD arbiter 33 is supplied to a gate of the FET 72.

The switch 73 is connected to an inverted input terminal of the comparator 74 and selects a terminal a or b according to an ack signal from the EM arbiter 32 or the like. As a threshold, a voltage VH is supplied to the terminal a. As a threshold, a voltage VL (<VH) is supplied to the terminal b. Therefore, the voltage VH or VL is supplied to the inverted input terminal of the comparator 74.

The comparator 74 compares the voltage of the capacitor 71 supplied to the non-inverted input terminal thereof with the voltage VH or VL supplied to the inverted input terminal thereof and outputs an EM request signal of an H level or an L level which represents the comparison result.

Figure 5:
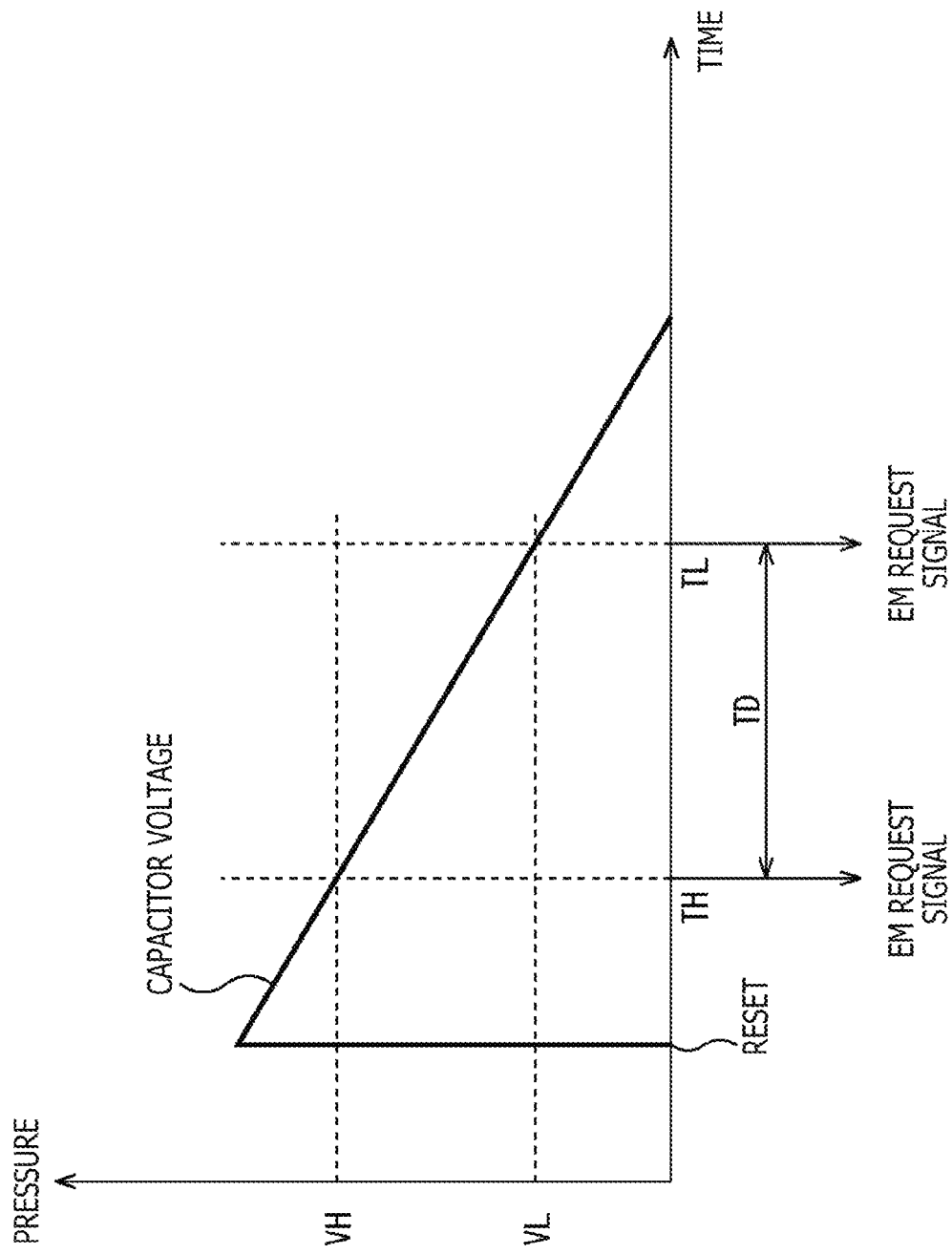
FIG. 5 is a diagram for explaining an example in which the EM section 53 reads photoelectric current in (a PD 62 of) the pixel 51.

FIG. 5 is a diagram for explaining an example in which the EM section 53 reads photoelectric current in the pixel 51 (the PD 61 of the pixel 51).

FIG. 5 illustrates an example of a temporal change of the voltage of the capacitor 71.

In the EM section 53, the FET 72 is temporarily changed from an off state to an on state in response to a reset signal which temporarily changes from an H level to an L level. When the FET 72 is turned on, the capacitor 71 is connected to the power source VDD via the FET 72 and is reset to be equal to a power source voltage of the power source VDD. In this case, the power source voltage of the power source VDD is higher than the voltage VH.

By a photoelectric current flow in the PD 62 of the pixel 51, the voltage of the reset capacitor 71 is changed according to the photoelectric current. That is, because of the photoelectric current flow in the PD 62, the voltage of the capacitor 71 is lowered at an inclination according to the photoelectric current.

In the EM section 53, the photoelectric current is read on the basis of the voltage change of the capacitor 71 according to the photoelectric current.

That is, the switch 73 selects the terminal an immediately after the capacitor 71 is reset, and as a result, the voltage VH is supplied to the inverted input terminal of the comparator 74.

The comparator 74 compares the voltage of the capacitor 71 supplied to the non-inverted input terminal thereof with the voltage VH supplied to the inverted input terminal thereof. In a case where the voltage of the capacitor 71 is higher than the voltage VH, the comparator 74 outputs not the L level but the H level, for example. Then, when the voltage of the capacitor 71 is lowered to become equal to or lower than the voltage VH, the comparator 74 outputs the L level in the form of an EM request signal. Here, an EM request signal that is outputted by the comparator 74 when the voltage of the capacitor 71 becomes equal to or lower than the voltage VH is also referred to as a first EM request signal.

The first EM request signal outputted by the comparator 74 is received by the EM arbiter 32. After receiving the first EM request signal, the EM arbiter 32 sends an ack signal back to the EM section 53. The switch 73 of the EM section 53 selects the terminal b according to the ack signal from the EM arbiter 32. As a result, the voltage VL (<VH) is supplied to the inverted input terminal of the comparator 74.

Immediately after the voltage of the capacitor 71 becomes equal to or lower than the voltage VH, the comparator 74 outputs the H level because the voltage of the capacitor 71 supplied to the non-inverted input terminal of the comparator 74 is higher than the voltage VL supplied to the inverted input terminal of the comparator 74.

Thereafter, when the voltage of the capacitor 71 is lowered to be equal to or lower than the voltage VL, the comparator 74 outputs the L level in the form of an EM request signal. Here, an EM request signal that is outputted by the comparator 74 when the voltage of the capacitor 71 is lowered to be equal to or lower than the voltage VL is also referred to as a second EM request signal.

It is assumed here that, with respect to a clock time when the capacitor 71 is reset, a clock time when the first EM request signal is outputted and a clock time when the second EM request signal is outputted are defined as a clock time TH and a clock time TL, respectively. The clock time TH regarding the first EM request signal and the clock time TL regarding the second EM request signal each vary depending on the voltage change in the capacitor 71, that is, the photoelectric current in the PD 62 of the pixel 51. Therefore, it can be considered that outputting the first and second EM request signals is equivalent to reading the photoelectric current in the PD 62 of the pixel 51.

The first and second EM request signals outputted by the comparator 74 are received by the EM arbiter 32 and are supplied, as EM event data, to the output section 34.

According to the EM event data from the EM arbiter 32, the output section 34 generates a pixel signal of the pixel 51 from which the photoelectric current has been read.

That is, the output section 34 generates, as a pixel signal of the pixel 51, a voltage corresponding to a time period TD from the clock time TH regarding the first EM request signal to the clock time TL regarding the second EM request signal.

It is to be noted that the output section 34 can generate, as a pixel signal of the pixel 51, a voltage corresponding to the clock time TH regarding the first EM request signal or a voltage corresponding to the clock time TL regarding the second EM request signal. However, when the voltage corresponding to the time period TD (a difference between the clock time TH and the clock time TL) from the clock time TH regarding the first EM request signal to the clock time TL regarding the second EM request signal is generated as a pixel signal of the pixel 51, CDS (Correlated Double Sampling) can substantially be implemented.

<Configuration Example of TD Section 52>

Figure 6:
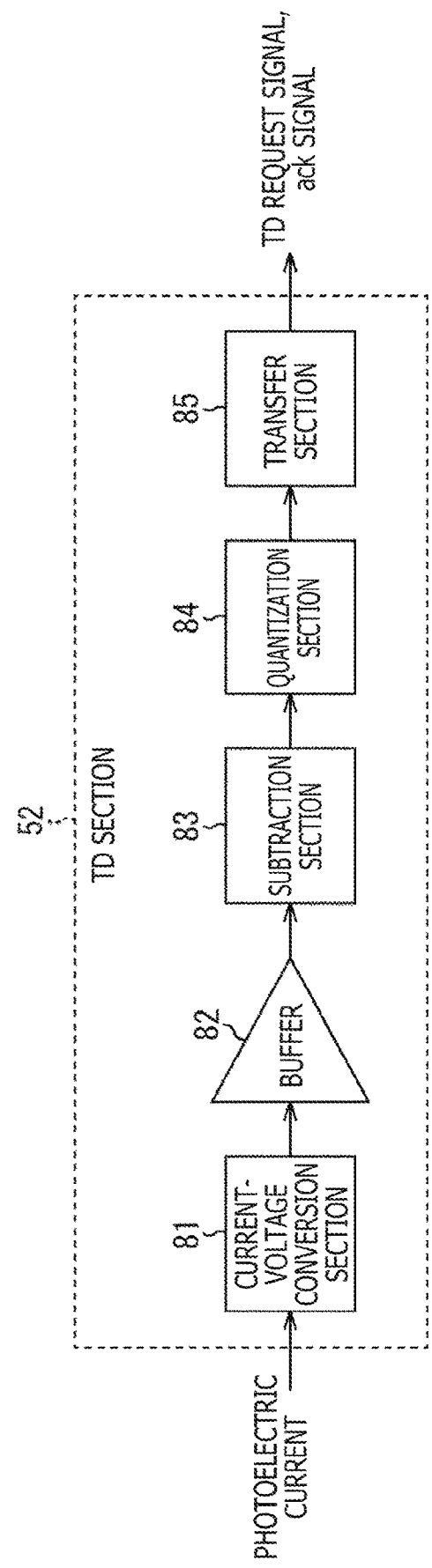
FIG. 6 is a block diagram depicting a configuration example of a TD section 52.

FIG. 6 is a block diagram depicting a configuration example of the TD section 52 in FIG. 3.

The TD section 52 includes a current-voltage conversion section 81, a buffer 82, a subtraction section 83, a quantization section 84, and a transfer section 85.

The current-voltage conversion section 81 converts the photoelectric current supplied from the pixel 51 (the PD 61 of the pixel 51) into a voltage (hereinafter, also referred to as a photoelectric voltage) corresponding to a logarithm of the photoelectric current and supplies the voltage to the buffer 82.

The buffer 82 buffers the photoelectric voltage from the current-voltage conversion section 81 and supplies the buffered voltage to the subtraction section 83.

The subtraction section 83 calculates a difference between the photoelectric voltage at the moment and the photoelectric voltage at a timing that is slightly different from that moment and supplies a difference signal corresponding to the difference to the quantization section 84.

The quantization section 84 quantizes the difference signal from the subtraction section 83 into a digital signal and supplies the transfer section 85 with a quantization value of the difference signal.

The transfer section 85 detects an event in the pixel 51 according to the quantization value of the difference signal from the quantization section 84. In the case where an event in the pixel 51 is detected, the transfer section 85 outputs (transfers) a TD request signal to the TD arbiter 33. In addition, the transfer section 85 receives an ack signal supplied from the TD arbiter 33 in response to the TD request signal.

<Configuration Example of Current-Voltage Conversion Section 81>

Figure 7:
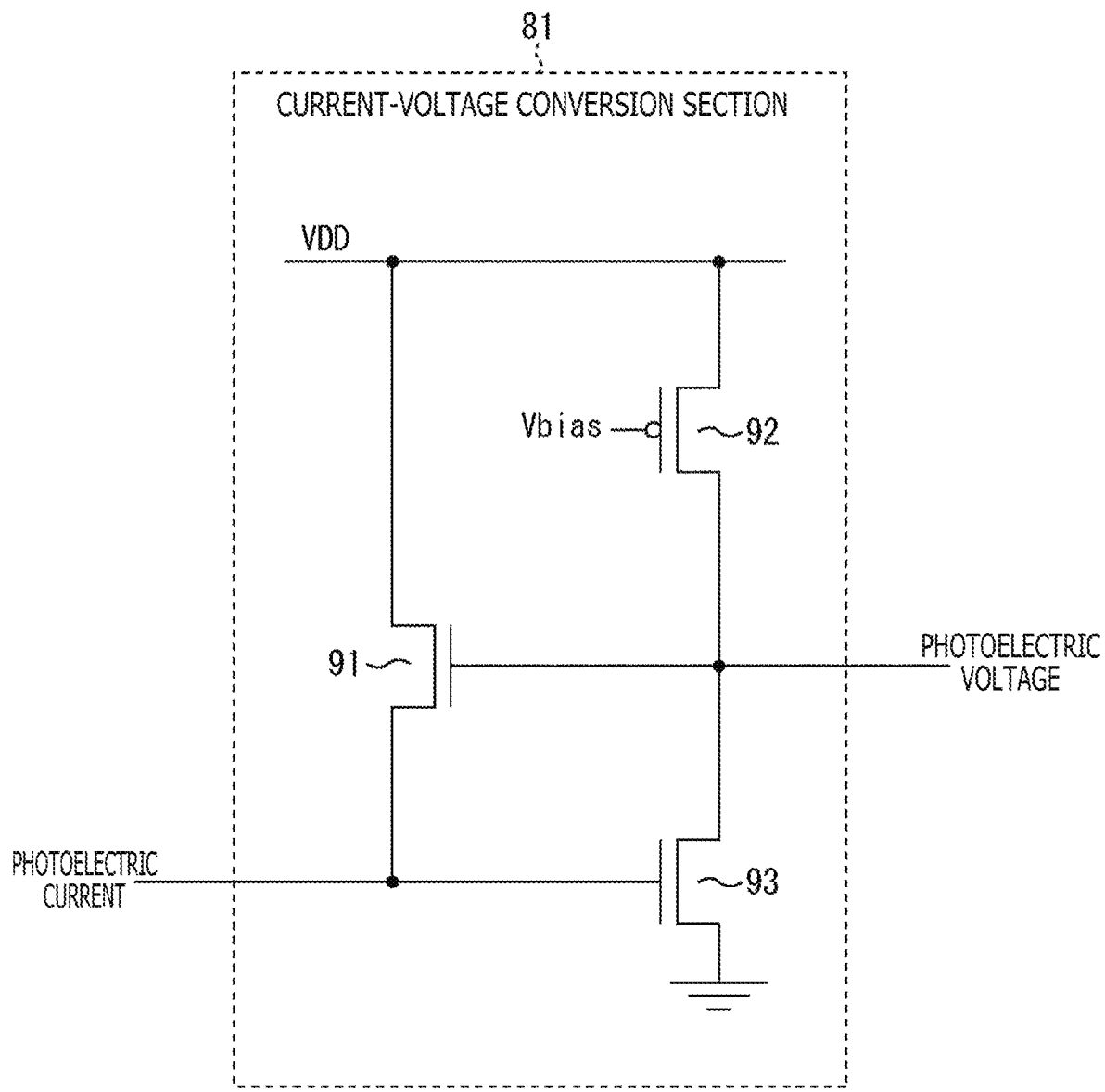
FIG. 7 is a circuit diagram depicting a configuration example of a current-voltage conversion section 81.

FIG. 7 is a circuit diagram depicting a configuration example of the current-voltage conversion section 81 in FIG. 6.

The current-voltage conversion section 81 includes transistors 91 to 93. For example, N-type MOS FETs can be adopted as the transistors 91 and 93. For example, a P-type MOS (PMOS) FET can be adopted as the transistor 92.

A source of the transistor 91 is connected to a gate of the transistor 93. The photoelectric current is supplied from the pixel 51 (the PD 61 of the pixel 51) to the connection point between the source of the transistor 91 and the gate of the transistor 93. A drain of the transistor 91 is connected to the power source VDD, and a gate of the transistor 91 is connected to a drain of the transistor 93.

A source of the transistor 92 is connected to the power source VDD, and a drain of the transistor 92 is connected to the connection point between the gate of the transistor 91 and the drain of the transistor 93. A prescribed bias voltage Vbias is applied to a gate of the transistor 92.

A source of the transistor 93 is grounded.

In the current-voltage conversion section 81, the drain of the transistor 91 is connected to the power source VDD side, and thus, a source follower is formed. By means of the transistor 91 which is the source follower and the transistor 93 which has the gate connected to the source of the transistor 91, the photoelectric current from the pixel 51 is converted into a photoelectric voltage corresponding to the logarithm of the photoelectric current.

The photoelectric voltage is supplied from the connection point between the gate of the transistor 91 and the drain of the transistor 93 to the buffer 82 (FIG. 6).

<Configuration Examples of Subtraction Section 83 and Quantization Section 84>

Figure 8:
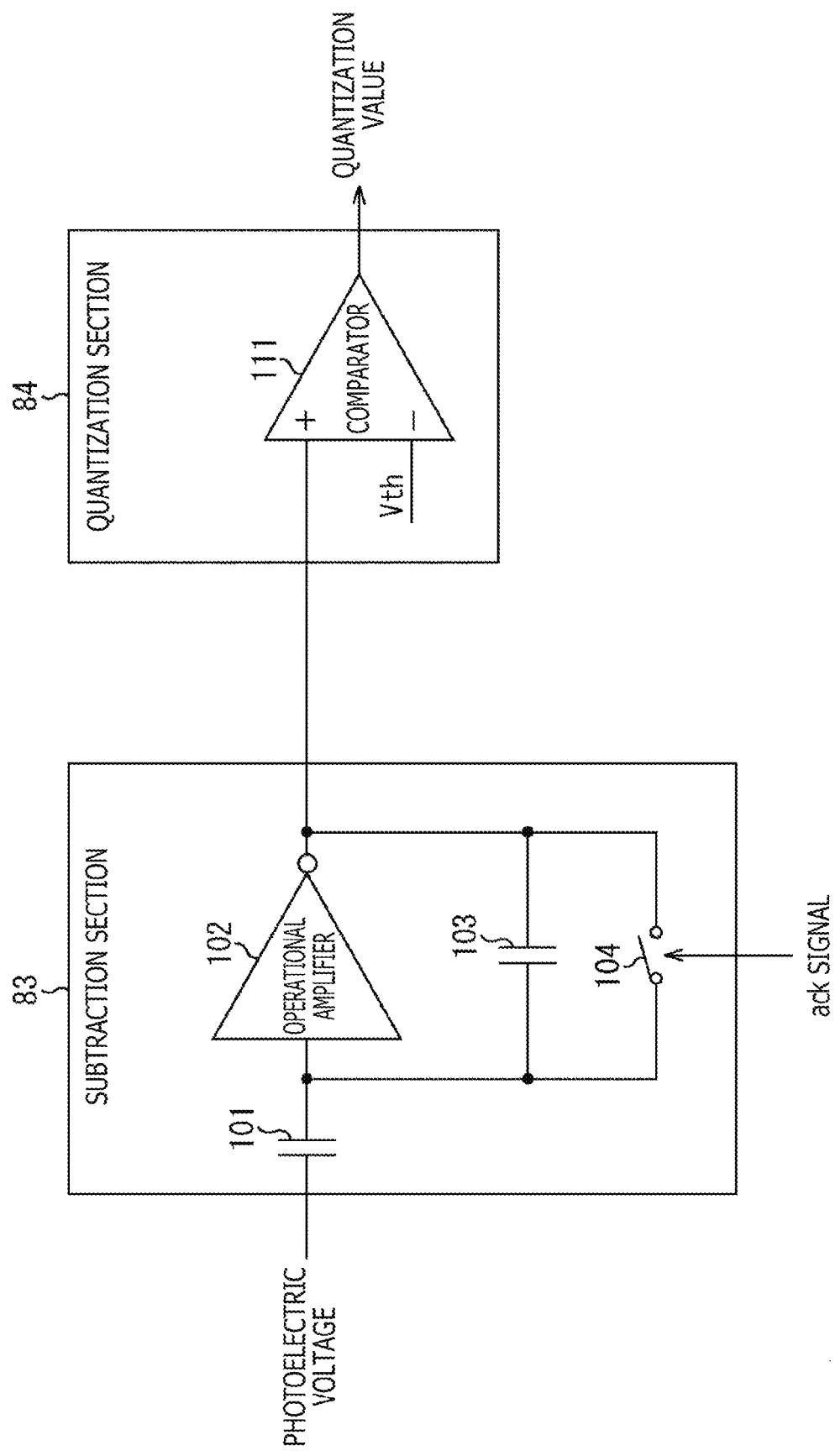
FIG. 8 is a circuit diagram depicting configuration examples of a subtraction section 83 and a quantization section 84.

FIG. 8 is a circuit diagram depicting configuration examples of the subtraction section 83 and the quantization section 84 in FIG. 6.

The subtraction section 83 includes a capacitor 101, an operational amplifier 102, a capacitor 103, and a switch 104. The quantization section 84 includes a comparator 111.

The capacitor 101 has one end connected to an output terminal of the buffer 82 (FIG. 6) and another end connected to an input terminal of the operational amplifier 102. Therefore, a photoelectric voltage is inputted to the input terminal of the operational amplifier 102 via the capacitor 101.

An output terminal of the operational amplifier 102 is connected to a non-inverted input terminal (+) of the comparator 111.

The capacitor 103 has one end connected to the input terminal of the operational amplifier 102 and another end connected to the output terminal of the operational amplifier 102.

The switch 104 is connected to the capacitor 103 so as to turn on/off connection between both ends of the capacitor 103. The switch 104 is turned on/off according to the ack signal from the TD arbiter 33 or the like, to thereby turn on/off the connection between both ends of the capacitor 103.

The photoelectric voltage of the buffer 82 (FIG. 6) side of the capacitor 101 when the switch 104 is turned on is represented by Vinit, and a capacitance (electrostatic capacitance) of the capacitor 101 is represented by C1. The input terminal of the operational amplifier 102 is virtually grounded. An electric charge Qinit that is accumulated in the capacitor 101 in the case where the switch 104 is on is expressed by Expression (1).

$$Qinit = C1 \times Vinit \quad (1)$$

In addition, in the case where the switch 104 is on, both ends of the capacitor 103 are short-circuited, and therefore, the electric charge accumulated in the capacitor 103 becomes zero.

When the photoelectric voltage of the buffer 82 (FIG. 6) side of the capacitor 101 in the case where the switch 104 is turned off is represented by Vafter, an electric charge Qafter that is accumulated in the capacitor 101 in the case where the switch 104 is turned off is expressed by Expression (2).

$$Qafter = C1 \times Vafter \quad (2)$$

When a capacitance of the capacitor 103 and an output voltage from the operational amplifier 102 are represented by C2 and Vout, respectively, an electric charge Q2 that is accumulated in the capacitor 103 is expressed by Expression (3).

$$Q2 = -C2 \times Vout \quad (3)$$

Since a total electric charge quantity of the electric charge in the capacitor 101 and the electric charge in the capacitor 103 does not change before and after the switch 104 is turned off, Expression (4) is established.

$$Qinit = Qafter + Q2 \quad (4)$$

By substitution of Expressions (1) to (3) into Expression (4), Expression (5) can be obtained.

$$Vout = -(C1/C2) \times (Vafter - Vinit) \quad (5)$$

According to Expression (5), the subtraction section 83 performs a subtraction between the photoelectric voltages Vafter and Vinit, that is, calculates a difference signal (Vout) corresponding to a difference (Vafter−Vinit) between the photoelectric voltages Vafter and Vinit. According to Expression (5), a gain of the subtraction by the subtraction section 83 is C1/C2. Since maximizing the gain is commonly desired, it is preferable to design C1 to be large and design C2 to be small. On the other hand, when C2 is excessively small, kTC noise is increased, so that there is a possibility that a noise characteristic is deteriorated. Therefore, reduction of the capacitance of C2 is restricted within a range where the noise is allowable. Furthermore, an area-related restriction is imposed on the capacitances C1 and C2 because the TD section 52 including the subtraction section 83 is provided for each pixel unit 41. In view of the above points, values of the capacitances C1 and C2 are decided.

The comparator 111 compares the difference signal from the subtraction section 83 with a prescribed threshold (voltage) Vth applied to an inverted input terminal (−) thereof. The comparator 111 outputs, as a quantization value of the difference signal, an H (High) level or an L (Low) level, for example, which indicates the comparison result of the difference signal with the threshold Vth, to the transfer section 85.

In a case where occurrence of a light quantity change as an event is recognized according to the quantization value of the difference signal from the quantization section 84, that is, in a case where the quantization value indicates that the difference signal (Vout) is greater (or smaller) than the threshold Vth, the transfer section 85 recognizes that an event in the pixel 51 has been detected and outputs a TD request signal to the TD arbiter 33.

In response to the TD request signal from the transfer section 85, the TD arbiter 33 generates event data indicating the occurrence of the event, that is, event data indicating that the event has been detected and outputs the event data to the output section 34.

It is to be noted that, when a gain of the current-voltage conversion section 81 is defined as $CG_{log}$, a gain of the buffer 82 is set to 1, and a gain of the quantization section 84 is defined as G, a gain A of the entire TD section 52 is expressed by the following expression.

$$A = CG_{log} C1/C2 Gi_{photo} \qquad (6)$$

Here, $i_{photo}$ represents photoelectric current.

It is to be noted that the pixel 51 can receive any light as incident light by providing an optical filter, such as a color filter, configured to allow prescribed light to pass therethrough. For example, in a case where the pixel 51 receives visible light as incident light, the event data indicates occurrence of a change in pixel value in an image in which a visually-recognizable subject is included. In addition, for example, in a case where the pixel 51 receives, as incident light, infrared rays, millimeter waves, etc. for measuring distances, the event data indicates occurrence of a change in distance to a subject. Moreover, for example, in a case where the pixel 51 receives, as incident light, infrared rays for measuring temperature, the event data indicates occurrence of a temperature change in a subject. In the present embodiment, it is assumed that the pixel 51 receives visible light as incident light.

<Configuration Examples of EM arbiter 32 and TD Arbiter 33>

Figure 9:
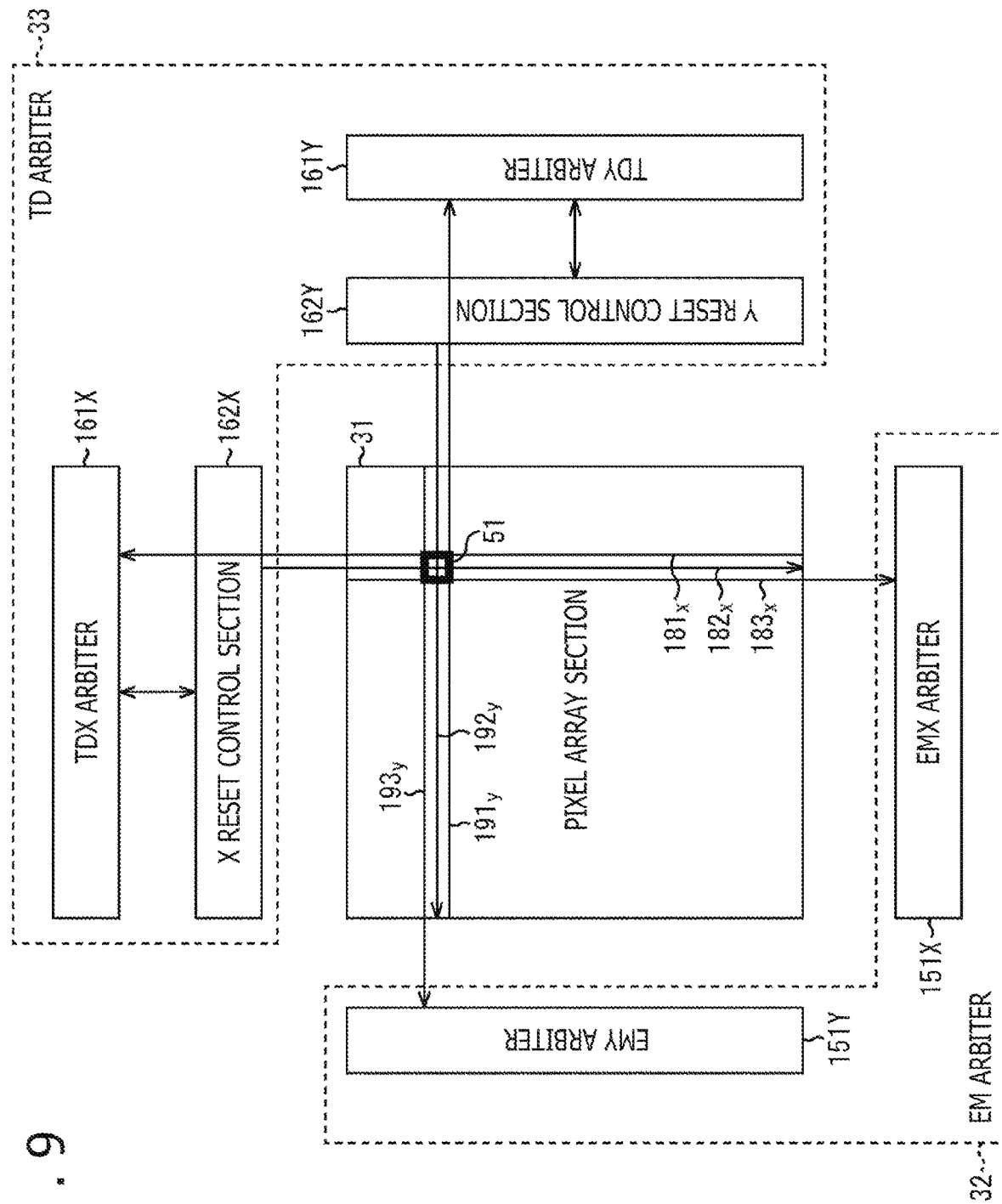
FIG. 9 is a block diagram depicting configuration examples of an EM arbiter 32 and a TD arbiter 33.

FIG. 9 is a block diagram depicting configuration examples of the EM arbiter 32 and the TD arbiter 33.

The EM arbiter 32 includes an EMX arbiter 151X and an EMY arbiter 151Y.

In the pixel array section 31, EMX request signal lines 183 are arranged for respective columns of the pixels 51 (the pixel units 41 including the pixels 51), and EMY request signal lines 193 are arranged for respective rows of the pixels 51. Here, the EMX request signal line 183 that is the x-th column line from the left is also expressed as the EMX request signal line 183$_x$. The EMY request signal line 193 that is the y-th row line from the top is also expressed as the EMY request signal line 193$_y$.

A reset signal is supplied from the TD arbiter 33 to the pixel 51 (the pixel unit 41 including the pixel 51) where the event has been detected, and the photoelectric current in the pixel 51 is read in response to the reset signal. Subsequently, in response to the reading of the photoelectric current from the pixel 51, the pixel 51 (the pixel unit 41 including the pixel 51) where the event has been detected outputs an EM request signal to the EM arbiter 32.

The EM request signal outputted from the pixel 51 (the pixel unit 41 including the pixel 51) is transmitted to the EMX arbiter 151X and the EMY arbiter 151Y via the EMX request signal line 183 and the EMY request signal line 193, respectively.

Here, an EM request signal that is transmitted via the EMX request signal line 183 is also referred to as an EMX request signal, and an EM request signal that is transmitted via the EMY request signal line 193 is also referred to as an EMY request signal.

The EMX arbiter 151X and the EMY arbiter 151Y receive the EMX request signal and the EMY request signal transmitted via the EMX request signal line 183 and the EMY request signal line 193, respectively.

On the basis of a position x of the EMX request signal line 183$_x$ via which the EMX request signal is transmitted to be received by the EMX arbiter 151X and a position y of the EMY request signal line 193$_y$ via which the EMY request signal is transmitted to be received by the EMY arbiter 151Y, the EM arbiter 32 identifies the position (x, y) of the pixel 51 (the pixel unit 41 including the pixel 51) having outputted the EM request signal and supplies the output section 34 with an EM request signal that includes the position (x, y) of the pixel 51.

The TD arbiter 33 includes a TDX arbiter 161X, a TDY arbiter 161Y, an X reset control section 162X, and a Y reset control section 162Y.

In the pixel array section 31, TDX request signal lines 181 are arranged for respective columns of the pixels 51, and TDY request signal lines 191 are arranged for respective rows of the pixels 51. Further, in the pixel array section 31, X reset signal lines 182 are arranged for respective columns of the pixels 51, and Y reset signal lines 192 are arranged for respective rows of the pixels 51.

Here, the TDX request signal line 181 that is the x-th column line from the left is also expressed as the TDX request signal line 181$_x$. The TDY request signal line 191 that is the y-th row line from the top is also expressed as the TDY request signal line 191$_y$. Similarly, the X reset signal line 182 that is the x-th column line from the left is also expressed as the X reset signal line 182$_x$. The Y reset signal line 192 that is the y-th row line from the top is also expressed as the Y reset signal line 192$_y$.

A TD request signal outputted by the pixel 51 is transmitted to the TDX arbiter 161X and the TDY arbiter 161Y via the TDX request signal line 181 and the TDY request signal line 191, respectively.

Here, a TD request signal that is transmitted via the TDX request signal line 181 is also referred to as a TDX request signal, and a TD request signal that is transmitted via the TDY request signal line 191 is also referred to as a TDY request signal.

The TDX arbiter 161X and the TDY arbiter 161Y receive the TDX request signal and the TDY request signal transmitted via the TDX request signal line 181 and the TDY request signal line 191, respectively.

On the basis of a position x of the TDX request signal line 181$_x$ via which the TDX request signal is transmitted to be received by the TDX arbiter 161X and a position y of the TDY request signal line 191$_y$ via which the TDY request signal is transmitted to be received by the TDY arbiter 161Y, the TD arbiter 33 identifies the position (x, y) of the pixel 51 having outputted the TD request signal, that is, the pixel 51 (the pixel unit 41 including the pixel 51) where the event has been detected and supplies the output section 34 with event data that includes the position (x, y) of the pixel 51.

Upon receiving the TDX request signal from the TDX request signal line 181$_x$, the TDX arbiter 161X controls the X reset control section 162X to transmit a reset signal via the X reset signal line 182$_x$. Under control of the TDX arbiter 161X, the X reset control section 162X transmits a reset signal via the X reset signal line 182$_x$.

In a similar way, upon receiving the TDY request signal from the TDY request signal line 191$_y$, the TDY arbiter 161Y controls the Y reset control section 162Y to transmit a reset signal via the Y reset signal line 192$_y$. Under control of the TDY arbiter 161Y, the Y reset control section 162Y transmits a reset signal via the Y reset signal line 192$_y$.

Here, a reset signal that is transmitted via the X reset signal line 182$_x$ is also referred to as an X reset signal, and a reset signal that is transmitted via the Y reset signal line 192$_y$ is also referred to as a Y reset signal.

In the pixel array section 31, the capacitor 71 of the pixel 51 (the pixel unit 41 including the pixel 51) at the position (x, y), having simultaneously received the X reset signal transmitted via the X reset signal line $182_x$ and the Y reset signal transmitted via the Y reset signal line $192_y$, is reset, so that the photoelectric current is read therefrom.

Figure 10:
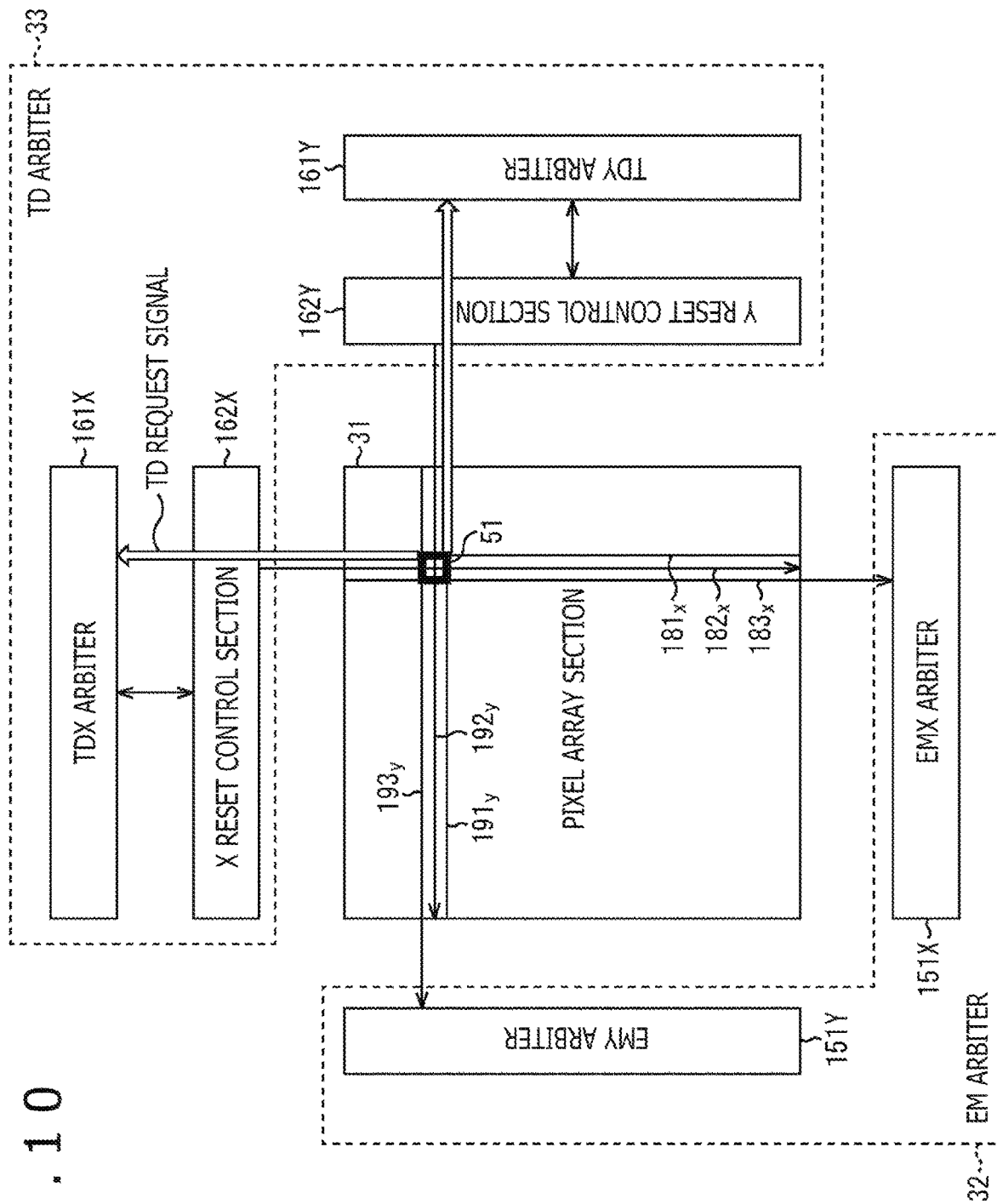
FIG. 10 is a diagram for explaining operation examples of the EM arbiter 32 and the TD arbiter 33 in a case where an event in the pixel 51 occurs.
Figure 11:
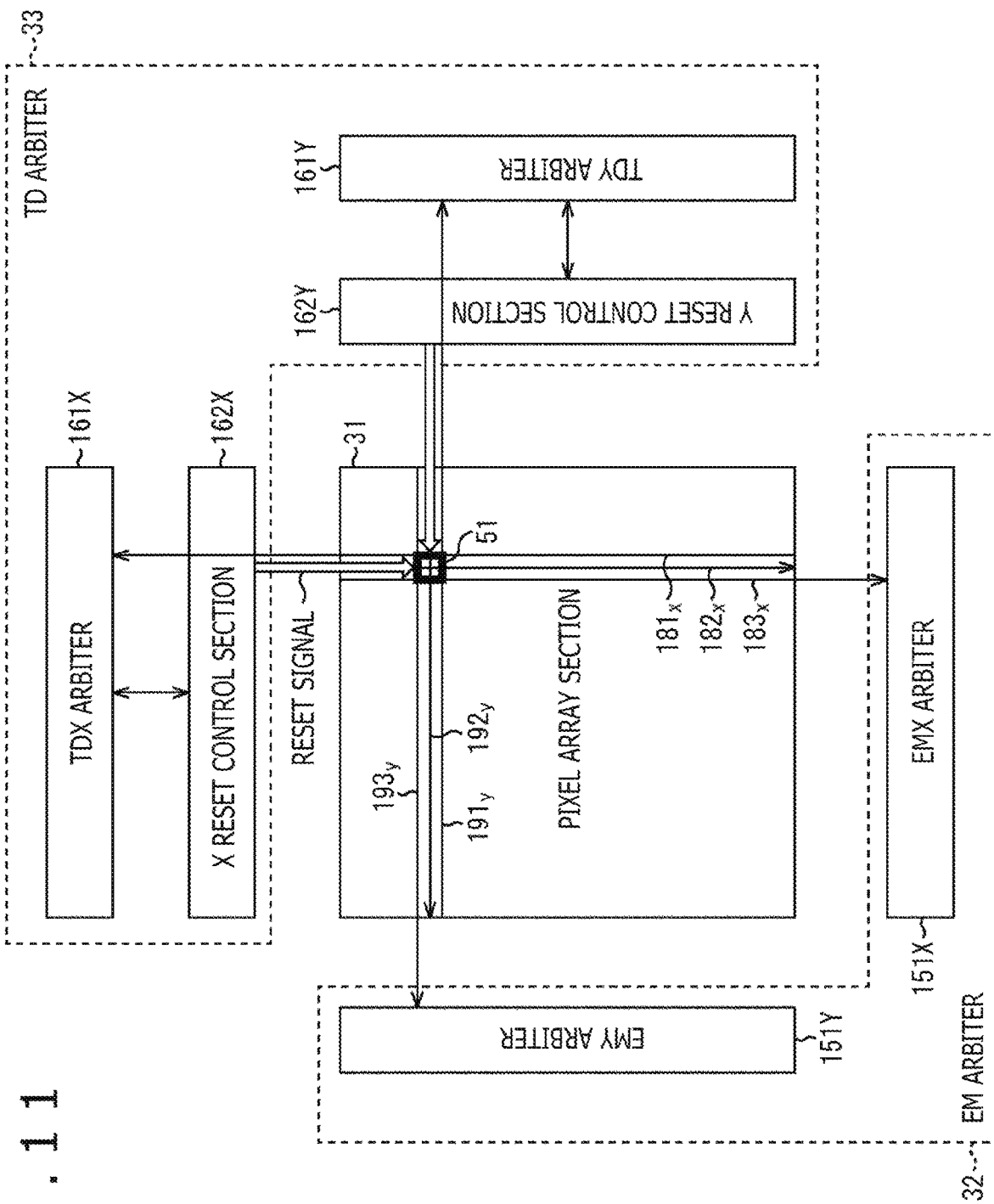
FIG. 11 is a diagram for explaining the operation examples of the EM arbiter 32 and the TD arbiter 33 in the case where an event in the pixel 51 occurs.
Figure 12:
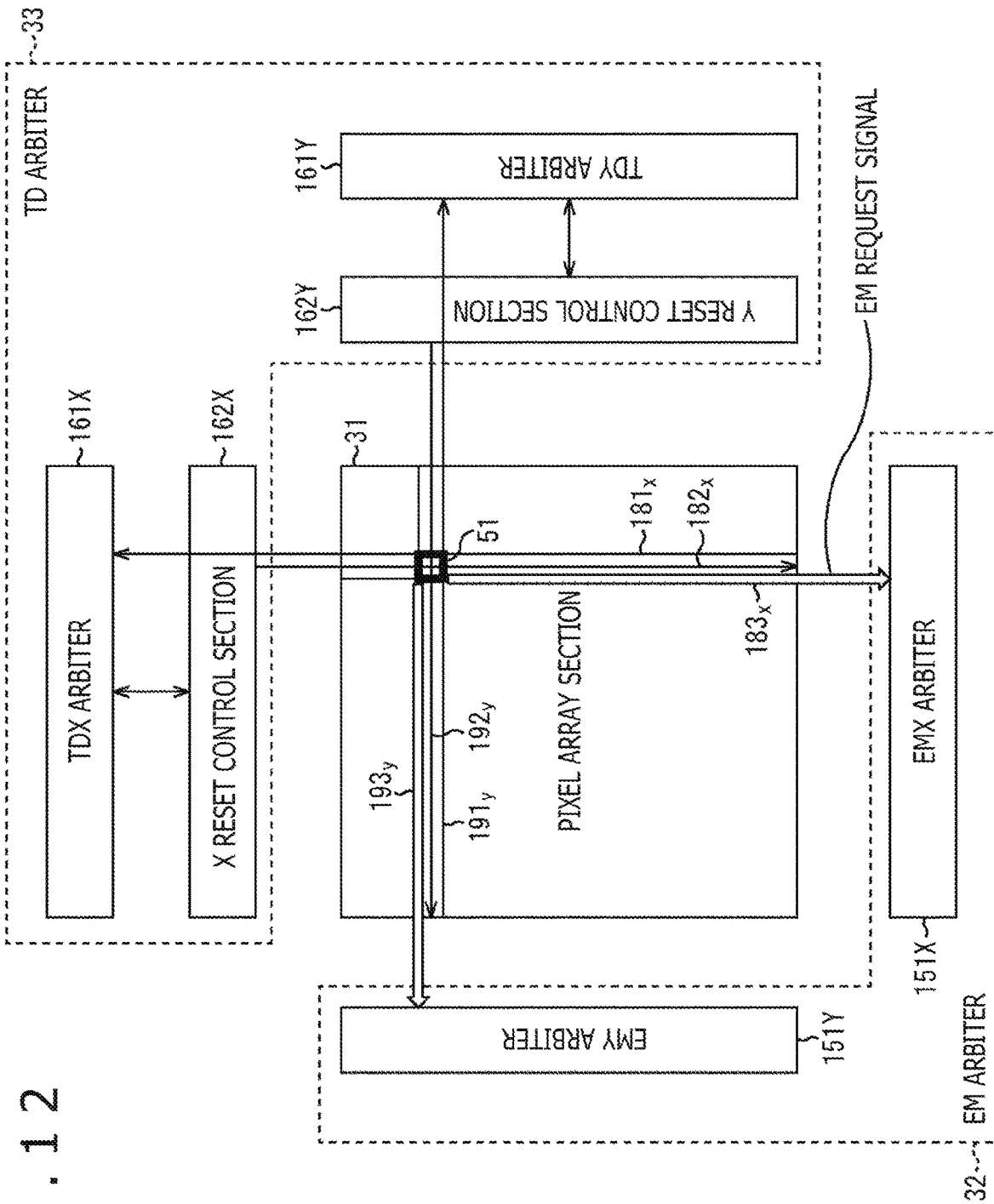
FIG. 12 is a diagram for explaining the operation examples of the EM arbiter 32 and the TD arbiter 33 in the case where an event in the pixel 51 occurs.

FIGS. 10, 11, and 12 are diagrams for explaining operation examples of the EM arbiter 32 and the TD arbiter 33 in the case where an event in the pixel 51 occurs.

For example, in the case where an event in the pixel 51 at the position (x, y) is detected, the pixel 51 (the pixel unit 41 including the pixel 51) outputs a TD request signal. As illustrated in FIG. 10, the TD request signal outputted by the pixel 51 is transmitted as a TDX request signal to the TDX arbiter 161X via the TDX request signal line $181_x$, and further, is transmitted as a TDY request signal to the TDY arbiter 161Y via the TDY request signal line $191_y$.

The TDX arbiter 161X and the TDY arbiter 161Y receive the TDX request signal and the TDY request signal via the TDX request signal line $181_x$ and the TDY request signal line $191_y$, respectively.

In the TD arbiter 33, the position (x, y) of the pixel 51 where the event has been detected is identified on the basis of the position x of the TDX request signal line $181_x$ via which the TDX request signal is transmitted to be received by the TDX arbiter 161X and the position y of the TDY request signal line $191_y$ via which the TDY request signal is transmitted to be received by the TDY arbiter 161Y. Event data that includes the position (x, y) of the pixel 51 is supplied to the output section 34.

Furthermore, in the TD arbiter 33, the TDX arbiter 161X controls the X reset control section 162X to transmit an X reset signal via the X reset signal line $182_x$, and further, the TDY arbiter 161Y controls the Y reset control section 162Y to transmit a Y reset signal via the Y reset signal line $192_y$, as illustrated in FIG. 11.

The X reset signal transmitted via the X reset signal line $182_x$ and the Y reset signal transmitted via the Y reset signal line $192_y$ are simultaneously received by the pixel 51 at the position (x, y) in the pixel array section 31, that is, the pixel 51 (the pixel unit 41 including the pixel 51) where the event has been detected. Accordingly, the capacitor 71 of the pixel 51 at the position (x, y) where the event has been detected is reset, so that the photoelectric current is read therefrom.

Subsequently, the pixel 51 at the position (x, y) where the event has been detected outputs an EM request signal in response to the reading of the photoelectric current from the pixel 51.

The EM request signal outputted by the pixel 51 is transmitted as an EMX request signal to the EMX arbiter 151X via the EMX request signal line $183_x$, and further, is transmitted as an EMY request signal to the EMY arbiter 151Y via the EMY request signal line $193_y$, as illustrated in FIG. 12.

The EMX arbiter 151X and the EMY arbiter 151Y receive the EMX request signal and the EMY request signal transmitted via the EMX request signal line $183_x$ and the EMY request signal line $193_y$, respectively.

Then, on the basis of the position x of the EMX request signal line $183_x$ via which the EMX request signal is transmitted to be received by the EMX arbiter 151X and the position y of the EMY request signal line $193_y$ via which the EMY request signal is transmitted to be received by the EMY arbiter 151Y, the EM arbiter 32 identifies the position (x, y) of the pixel 51 having outputted the EM request signal, that is, the pixel 51 where the event has been detected. The EM arbiter 32 supplies the output section 34 with an EM request signal that includes the position (x, y) of the pixel 51.

In response to the EM request signal from the EM arbiter 32, the output section 34 generates a pixel signal of the pixel 51 at the position (x, y) where the event has been detected, in the manner as previously explained with reference to FIG. 5.

As explained so far, in the sensor section 21, the photoelectric current in the pixel 51 at the position (x, y) where an event has been detected is read, and a pixel signal corresponding to the photoelectric current is generated.

Figure 13:
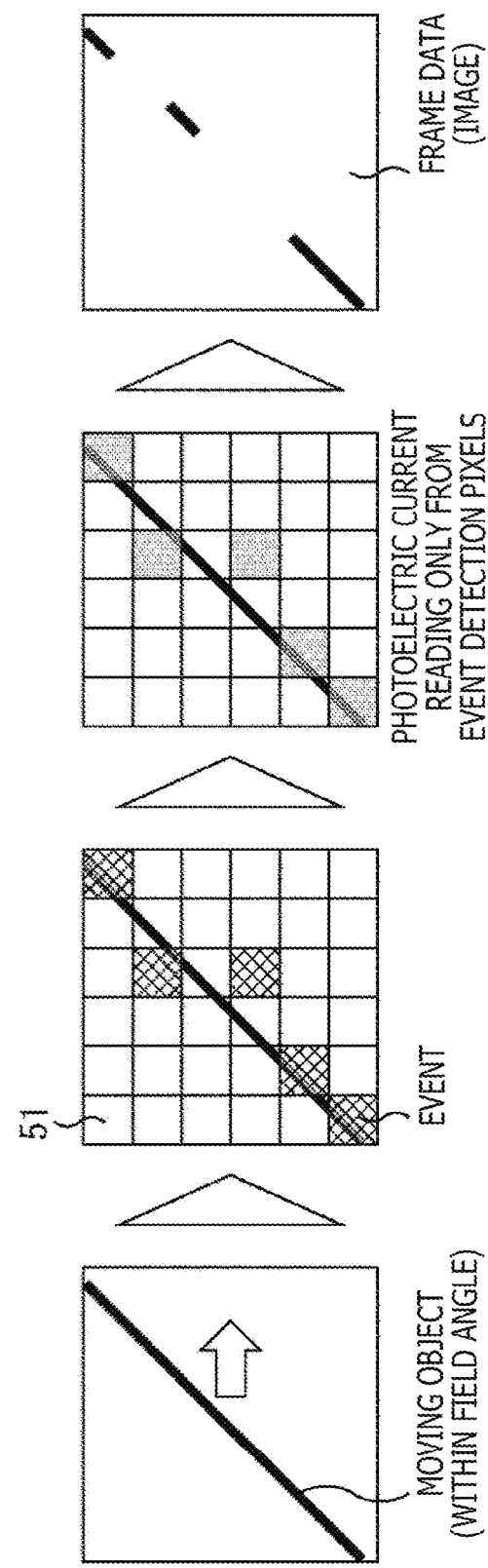
FIG. 13 is a diagram depicting an example of generation of frame data by using a pixel signal of the pixel 51 where an event has been detected.

FIG. 13 is a diagram depicting an example of generating frame data by using the pixel signal of the pixel 51 where an event has been detected.

It is assumed here that a linear moving object extending obliquely upward right is moving rightward from the left side within a field angle of photographing by the sensor section 21 (the pixel array section 31 of the sensor section 21), and that the sensor section 21 is performing photographing of the moving object.

In this case, as a result of movement of the linear moving object, an event in a pixel 51 where a light quantity change greater than a threshold occurs is detected.

A pixel 51 where an event is detected is defined as an event detection pixel. Photoelectric current in an event detection pixel is read, and a pixel signal corresponding to the photoelectric current is generated.

Then, the pixel signal of the event detection pixel is used to generate frame data including the pixel signal as a pixel value.

Here, a pixel 51 from which photoelectric current is read is defined as a read-out pixel. A method of reading photoelectric current in the above manner can be considered as a method (hereinafter, also referred to as a one-to-one correspondence method) for establishing a one-to-one correspondence between event detection pixels and read-out pixels, setting only the event detection pixels as read-out pixels without fail, and reading photoelectric current in the read-out pixels.

Incidentally, even when the linear moving object moves, an event is not necessarily detected in all the pixels 51 that include the moving object (an outline of the moving object). Specifically, among the pixels 51 that include the moving object, events can be detected from some pixels 51 while any event cannot be detected from the other pixels 51, depending on the degree of a light quantity change caused by the movement of the moving object.

In the one-to-one correspondence method, photoelectric current is not read from, among the pixels 51 that include the moving object, pixels 51 from which no event has been detected, as described above, so that no pixel signal is generated. Therefore, as an image corresponding to frame data that is generated by using a pixel signal, an unnatural image in which part of a subject (here, the linear moving object) is missing may be obtained.

Accordingly, the sensor section 21 can adopt a new reading method of setting pixels 51 other than event detection pixels as read-out pixels or refraining from setting event detection pixels as read-out pixels, instead of establishing a one-to-one correspondence between event detection pixels and read-out pixels, and reading photoelectric current from the read-out pixels.

Figure 14:
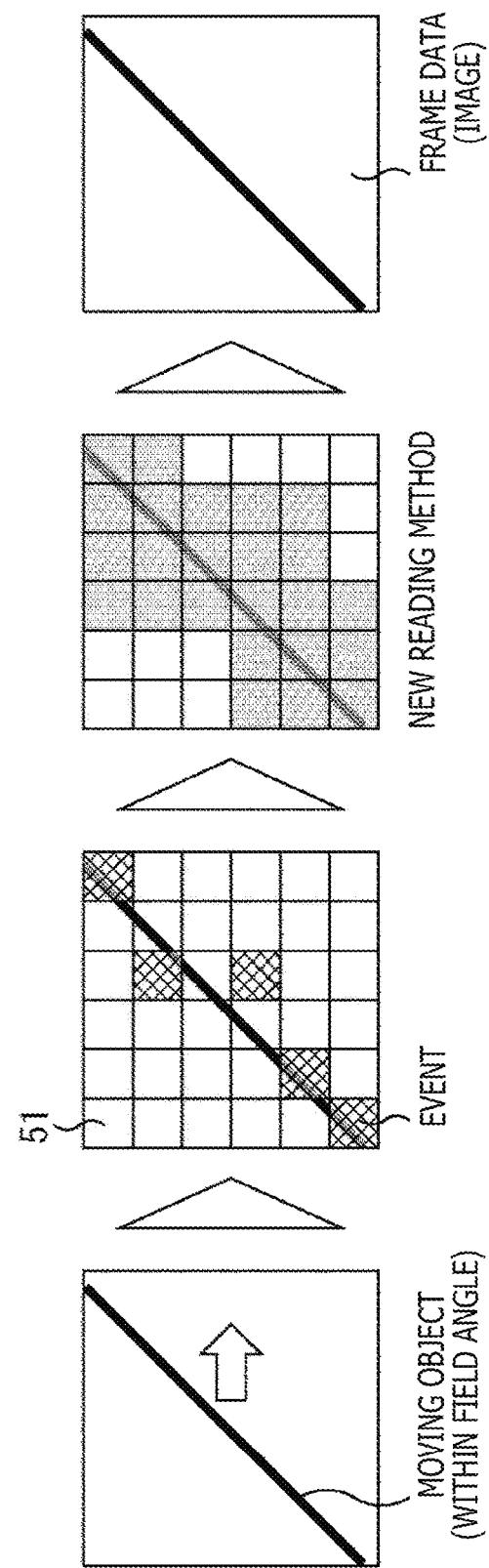
FIG. 14 is a diagram depicting an example of generation of frame data by using a pixel signal according to photoelectric current read by a new reading method.

FIG. 14 is a diagram depicting an example of generating frame data by using a pixel signal corresponding to the photoelectric current read by the new reading method.

In FIG. 14, a linear moving object is moving, as in FIG. 13, and events are detected from some pixels 51 while no event is detected from the other pixels 51, depending on the degree of light quantity changes caused by the movement of the moving object.

In the new reading method, not only event detection pixels but also pixels 51 disposed on the periphery of the event detection pixels (hereinafter, also referred to as peripheral pixels) are set as read-out pixels, for example, so that photoelectric current is read therefrom.

Accordingly, if a pixel 51, among the pixels 51 including the moving object, from which no event has been detected in the one-to-one correspondence method because of the degree of the light quantity change caused by movement of the moving object, is disposed on the periphery of an event detection pixel, photoelectric current is read therefrom.

As a result, according to the new reading method, a situation where, as an image corresponding to the frame data that is generated by using the pixel signals corresponding to the photoelectric current read from the pixels 51, an unnatural image in which part of the subject is missing is obtained, as in the case of the one-to-one correspondence method, can be suppressed.

Figure 15:
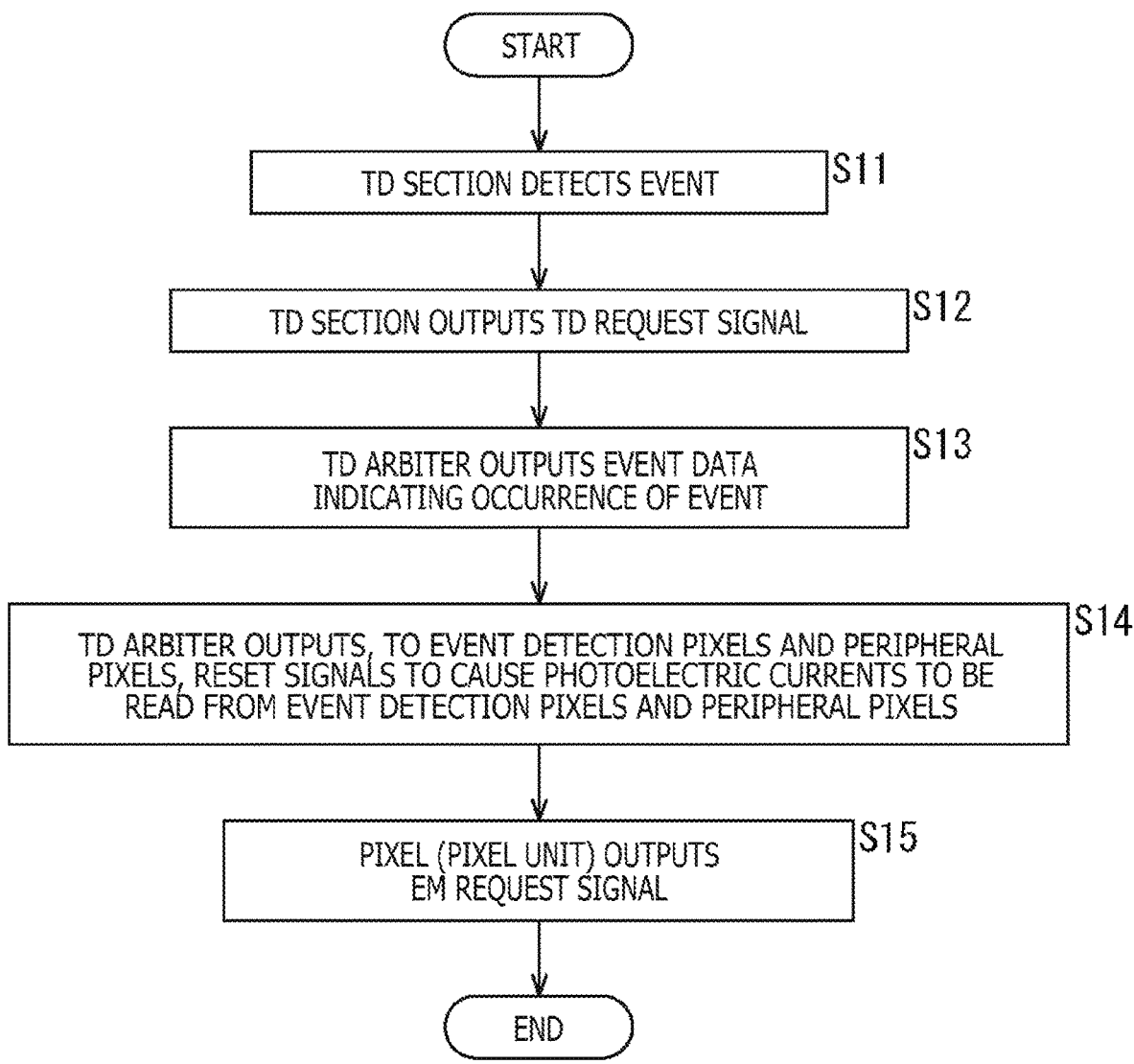
FIG. 15 is a flowchart for explaining an operation example of the sensor section 21 in which photoelectric current is read from the pixel 51 by the new reading method.

FIG. 15 is a flowchart for explaining an example of operation (control operation) of the sensor section 21 in which photoelectric current is read from a pixel 51 by the new reading method.

When an event in a pixel 51 occurs, the TD section 52 detects the event at step S11. Then, the process proceeds to step S12.

At step S12, the TD section 52 outputs a TD request signal to the TD arbiter 33 in response to the detection of the event. Then, the process proceeds to step S13.

At step S13, the TD arbiter 33 outputs event data to the output section 34 in response to the TD request signal from the TD section 52. Then, the process proceeds to step S14.

At step S14, the TD arbiter 33 outputs a reset signal to an event detection pixel where the event has been detected and a peripheral pixel of the event detection pixel (a pixel unit 41 including the event detection pixel or the peripheral pixel) in response to the TD request signal from the TD section 52, so that photoelectric current in the event detection pixel and the peripheral pixel are read. Then, the process proceeds to step S15.

At step S15, the event detection pixel and the peripheral pixel (the pixel units 41 including the event detection pixel and the peripheral pixel) output EM request signals to the EM arbiter 32 in response to the reading of the photoelectric current. The EM arbiter 32 receives the EM request signals from the event detection pixel and the peripheral pixel and supplies the EM request signals to the output section 34.

Hereinafter, first to fourth reading methods will be explained as specific examples of the new reading method.

<First Reading Method>

Figure 16:
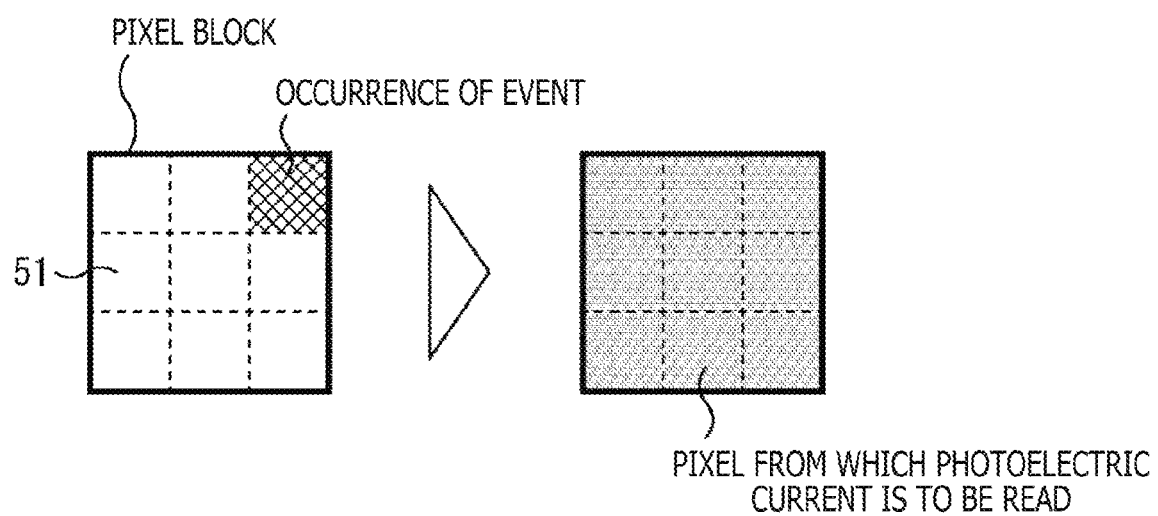
FIG. 16 is a diagram for explaining a first reading method.

FIG. 16 is a diagram for explaining the first reading method.

In the first reading method, the pixels 51 (the pixel units 41 including the pixels 51) constituting the pixel array section 31 are divided into blocks each including multiple pixels 51. In FIG. 16, three lateral pixels 51×three longitudinal pixels 51 constitute one pixel block.

In the first reading method, in a case where an event in at least one of the pixels 51 constituting the pixel block is detected, photoelectric current is read from all the pixels 51 included in the pixel block.

That is, in the first reading method, among the pixels 51 in the pixel block including an event detection pixel, pixels 51 excluding the event detection pixel are set as peripheral pixels, and photoelectric current in the event detection pixel and the peripheral pixels is read.

Figure 17:
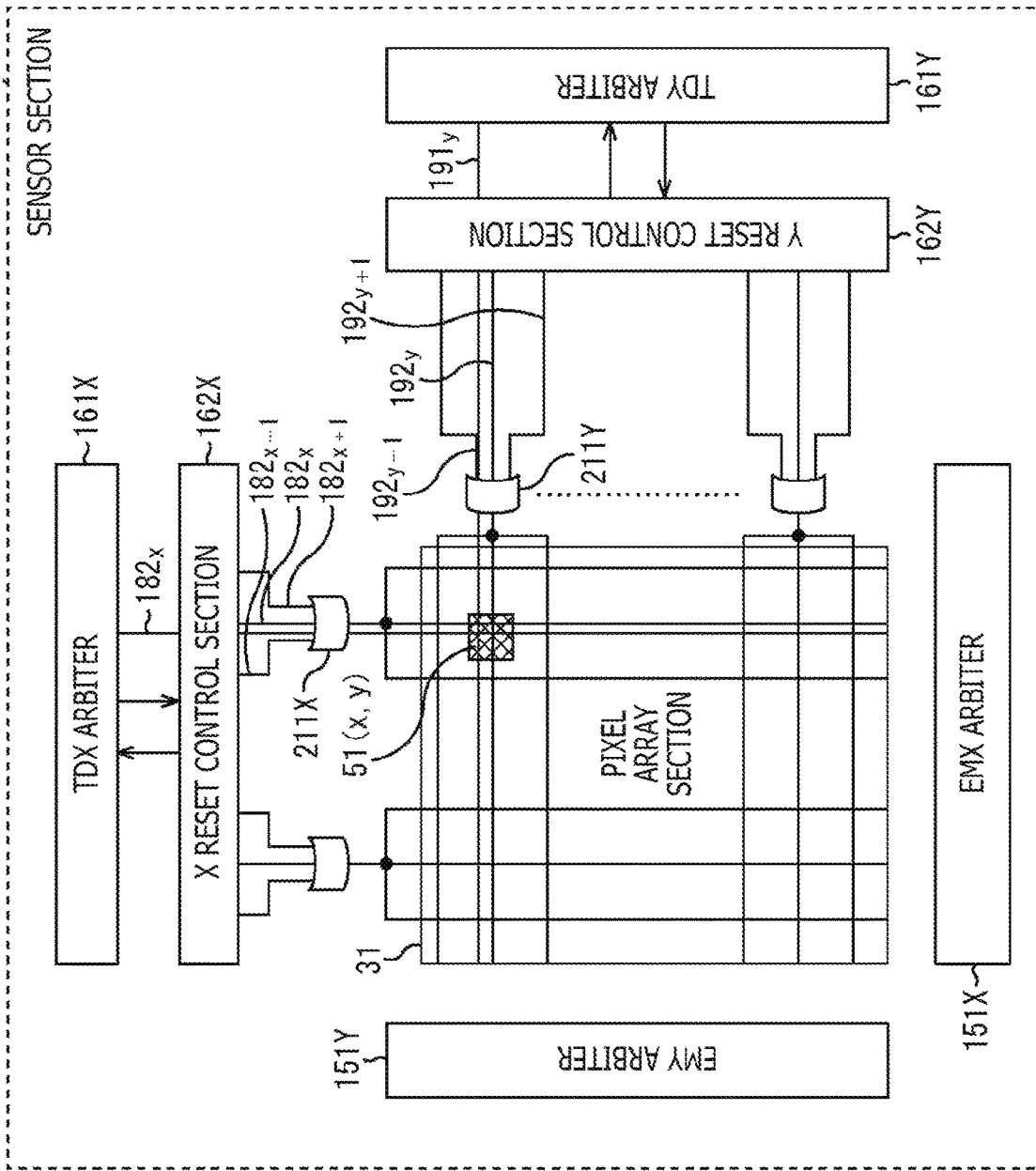
FIG. 17 is a diagram depicting a configuration example of the sensor section 21 in a case where the first reading method is adopted.

FIG. 17 is a diagram depicting a configuration example of the sensor section 21 in the case where the first reading method is adopted.

It is to be noted that illustration of the output section 34 is omitted in FIG. 17.

In FIG. 17, the sensor section 21 includes the pixel array section 31, the EMX arbiter 151X and the EMY arbiter 151Y which constitute the EM arbiter 32, and the TDX arbiter 161X, the TDY arbiter 161Y, the X reset control section 162X, and the Y reset control section 162Y which constitute the TD arbiter 33.

Further, the sensor section 21 includes a plurality of OR gates 211X and a plurality of OR gates 211Y.

The OR gates 211X and 211Y are provided for corresponding columns and corresponding rows, respectively, in a pixel block.

The X reset signal lines 182 that are connected to the pixels 51 (the pixel units 41 including the pixels 51) in a column, in the pixel block, corresponding to an OR gate 211X, are connected to an input terminal of the OR gate 211X.

An output terminal of the OR gate 211X is connected to the X reset signal lines 182 that are connected to the pixels 51 in the column, in the pixel block, corresponding to the OR gate 211X.

In a similar way, the Y reset signal lines 192 that are connected to the pixels 51 (the pixel units 41 including the pixels 51) in a row, in the pixel block, corresponding to an OR gate 211Y are connected to an input terminal of the OR gate 211Y.

The output terminal of the OR gate 211X is connected to the Y reset signal lines 192 that are connected to the pixels 51 in the row, in the pixel block, corresponding to the OR gate 211Y.

Here, it is assumed that, for example, each pixel block includes 3×3 pixels 51 as illustrated in FIG. 16. In addition, it is assumed that the position of the center pixel 51 among the 3×3 pixels 51 constituting the pixel block is defined as (x, y), and that the pixel 51 at the position (x, y) is expressed as the pixel 51 (x, y).

In this case, the X reset signal lines $182_{x-1}$, $182_x$, and $182_{x+1}$ that are connected to the X reset control section 162X are connected to the input terminal of an OR gate 211X corresponding to a column in the pixel block including the 3×3 pixels 51 including the pixel 51 (x, y). The output terminal of the OR gate 211X is connected to the X reset signal lines $182_{x-1}$, $182_x$, and $182_{x+1}$ that are respectively connected to the pixel 51 (x−1, y) in the x−1-th column, the pixel 51 (x, y) in the x-th column, and the pixel 51 (x+1, y) in the x+1-th column.

Further, the Y reset signal lines $192_{y-1}$, $192_y$, and $192_{y+1}$ that are connected to the Y reset control section 162Y are connected to the input terminal of an OR gate 211Y corresponding to a row in the pixel block including 3×3 pixels 51 including the pixel 51 (x, y). The output terminal of the OR gate 211Y is connected to the Y reset signal lines $192_{y-1}$, $192_y$, and $192_{y+1}$ that are respectively connected to the pixel 51 (x, y−1) in the y−1-th row, the pixel 51 (x, y) in the y-th row, and the pixel 51 (x, y+1) in the y+1 row.

With the above-described configuration, when an event occurs in a pixel 51 in a pixel block, reset signals outputted by the X reset control section 162X and the Y reset control section 162Y are supplied to pixels 51 included in the pixel block including the pixel 51 where the event has occurred. Accordingly, photoelectric current is read from all the pixels 51 in the pixel block.

It is to be noted that the OR gates 211X and 211Y are provided in FIG. 17, so that supply of reset signals outputted by the X reset control section 162X and the Y reset control section 162Y to the pixels 51 (the pixel units 41 including the pixels 51) is controlled by the OR gates 211X and 211Y. Alternatively, supply of such reset signals to the pixels 51 can be controlled by the X reset control section 162X and the Y reset control section 162Y without providing the OR gates 211X and 211Y.

<Second Reading Method>

Figure 18:
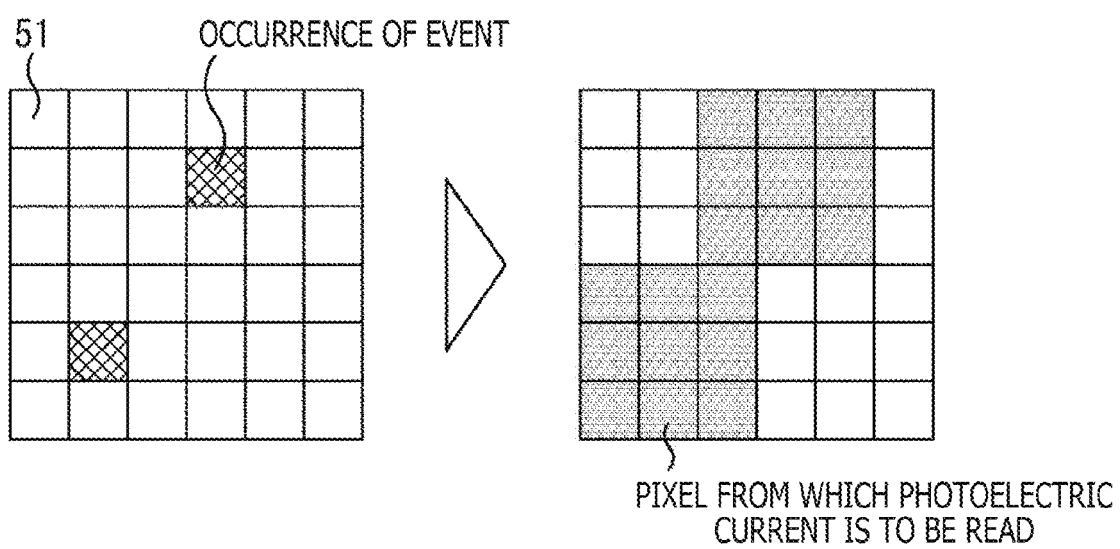
FIG. 18 is a diagram for explaining a second reading method.

FIG. 18 is a diagram for explaining the second reading method.

In the second reading method, photoelectric current is read from all the pixels 51 included in a prescribed range that is centered at a pixel 51 where an event has been detected.

That is, in the second reading method, the pixels 51, other than an event detection pixel, included in a prescribed range that is centered at the event detection pixel are set as peripheral pixels, and photoelectric current is read from the event detection pixel and the peripheral pixels.

In FIG. 18, a 3×3 range centered at the event detection pixel is set as the prescribed range.

Figure 19:
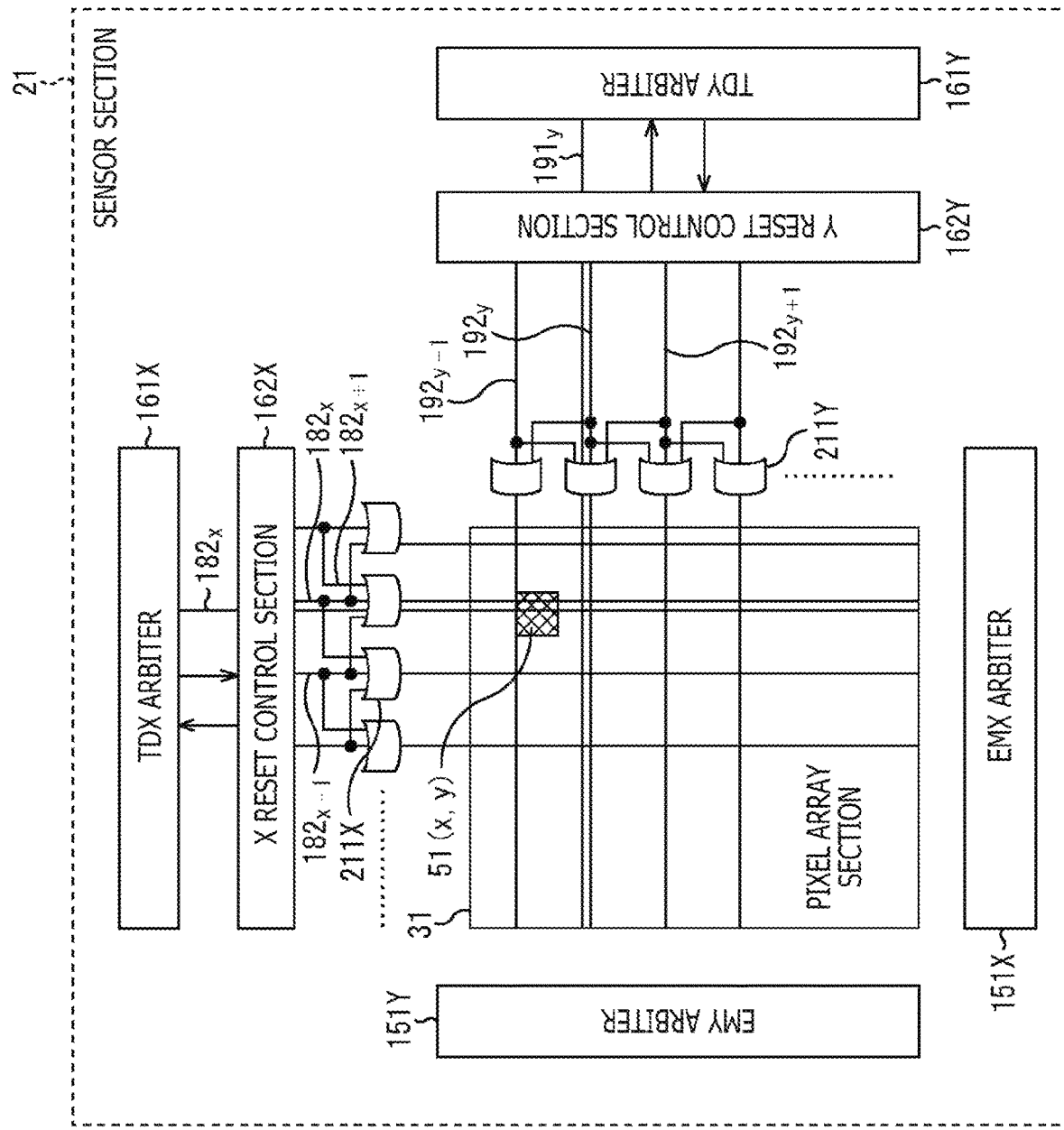
FIG. 19 is a diagram depicting a configuration example of the sensor section 21 in a case where the second reading method is adopted.

FIG. 19 is a diagram depicting a configuration example of the sensor section 21 in the case where the second reading method is adopted.

It is to be noted that illustration of the output section 34 is omitted in FIG. 19.

In FIG. 19, the sensor section 21 includes the pixel array section 31, the EMX arbiter 151X and the EMY arbiter 151Y which constitute the EM arbiter 32, and the TDX arbiter 161X, the TDY arbiter 161Y, the X reset control section 162X, and the Y reset control section 162Y which constitute the TD arbiter 33.

Further, the sensor section 21 includes a plurality of OR gates 221X and a plurality of OR gates 221Y.

The OR gates 221X and 221Y are provided for corresponding columns and corresponding rows of the pixels 51 (the pixel units 41 including the pixels 51).

The X reset signal line 182 that is connected to a pixel (a pixel unit 41 including a pixel 51) in a column corresponding to an OR gate 221X, and the X reset signal lines 182 that are connected to the peripheral pixels of the pixel 51 (the pixel units 41 including the peripheral pixels) (i.e., pixels 51 other than the center pixel 51 in the prescribed range that is centered at the pixel 51, in the second reading method) are connected to an input terminal of the OR gate 221X.

An output terminal of the OR gate 221X is connected to the X reset signal line 182 that is connected to the pixels 51 in the column corresponding to the OR gate 221X.

In a similar way, the Y reset signal line 192 that is connected to a pixel 51 (a pixel unit 41 including a pixel 51) in a row corresponding to an OR gate 221Y, and the Y reset signal lines 192 that are connected to the peripheral pixels of the pixel 51 (the pixel units 41 including the peripheral pixels) are connected to an input terminal of the OR gate 221Y.

An output terminal of the OR gate 221Y is connected to the Y reset signal line 192 that is connected to the pixels 51 in the row corresponding to the OR gate 221Y.

Here, in the case where the prescribed range is a 3×3 range as illustrated in FIG. 18, for example, the X reset signal lines $182_{x-1}$, $182_x$, and $182_{x+1}$ that are connected to the X reset control section 162X are connected to the input terminal of the OR gate 221X corresponding to the column of the pixel 51 (x, y). The output terminal of the OR gate 211X is connected to the X reset signal line $182_x$ that is connected to the pixel 51 (x, y) in the x-th column.

Further, the Y reset signal lines $192_{y-1}$, $192_y$, and $192_{y+1}$ that are connected to the Y reset control section 162Y are connected to the input terminal of the OR gate 221Y corresponding to the row of the pixel 51 (x, y). The output terminal of the OR gate 221Y is connected to the Y reset signal line $192_y$ that is connected to the pixel 51 (x, y) in the y-th row.

With the above-described configuration, when an event occurs in a certain pixel 51, reset signals outputted by the X reset control section 162X and the Y reset control section 162Y are supplied to pixels 51 included in the prescribed 3×3 range that is centered at the pixel 51 where the event has occurred. Accordingly, photoelectric current is read from all the pixels 51 included in the prescribed range that is centered at the event detection pixel.

It is to be noted that the OR gates 221X and 221Y are provided in FIG. 19, so that supply of reset signals outputted by the X reset control section 162X and the Y reset control section 162Y to the pixels 51 (the pixel units 41 including the pixels 51) is controlled by the OR gates 221X and 221Y. Alternatively, supply of such reset signals to the pixels 51 can be controlled by the X reset control section 162X and the Y reset control section 162Y without providing the OR gates 221X and 221Y.

<Third Reading Method>

Figure 20:
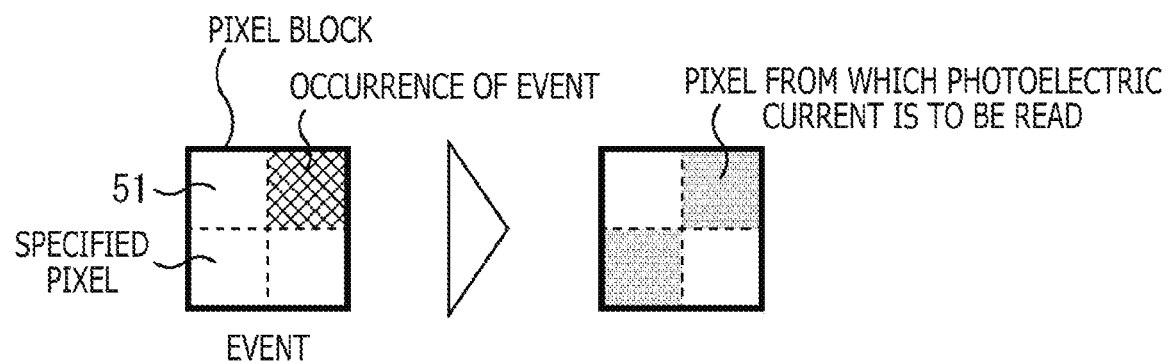
FIG. 20 is a diagram for explaining a third reading method.

FIG. 20 is a diagram for explaining the third reading method.

In the third reading method, the pixels 51 (the pixel units 41 including the pixels 51) constituting the pixel array section 31 are divided into blocks each including multiple pixels 51. Further, in the third reading method, one (at least one) pixel 51 included in the pixel block is set as a specified pixel.

In FIG. 20, for example, one pixel block includes 2×2 pixels 51, and a pixel 51 that is disposed on the lower left in the pixel block including 2×2 pixels 51 is set as a specified pixel.

In the third reading method, in a case where an event in at least one of the pixels 51 constituting the pixel block is detected, photoelectric current is read from the event detection pixel and the specified pixel in the pixel block. That is, in the third reading method, a specified pixel in a pixel block is regarded as a peripheral pixel, and photoelectric current is read from the event detection pixel and the peripheral pixel.

Consequently, as an image corresponding to frame data that is generated by using a pixel signal corresponding to photoelectric current read by the third reading method, an image obtained by performing image processing called "Dilation" on an image corresponding to frame data that is generated by using a pixel signal corresponding to photoelectric current in an event detection pixel is obtained.

FIG. 21 is a diagram depicting a configuration example of the sensor section 21 in the case where the third reading method is adopted.

It is to be noted that illustration of the output section 34 is omitted in FIG. 21.

In FIG. 21, the sensor section 21 includes the pixel array section 31, the EMX arbiter 151X and the EMY arbiter 151Y which constitute the EM arbiter 32, and the TDX arbiter 161X, the TDY arbiter 161Y, the X reset control section 162X, and the Y reset control section 162Y which constitute the TD arbiter 33.

Further, the sensor section 21 includes a plurality of OR gates 231X and a plurality of OR gates 231Y.

The OR gates 231X and 231Y are provided for each specified pixel (each pixel unit 41 including a specified pixel).

The X reset signal lines 182 that are connected to the pixels 51 included in a pixel block including a specified pixel (a pixel unit 41 including a specified pixel) are connected to an input terminal of an OR gate 231X.

An output from the OR gate 231X is supplied, as an X reset signal, to the specified pixel (the pixel unit 41 including the specified pixel).

In a similar way, the Y reset signal lines 192 that are connected to the pixels 51 in a pixel block including a specified pixel (a pixel unit 41 including a specified pixel) are connected to an input terminal of an OR gate 231Y.

An output from the OR gate 231Y is supplied, as a Y reset signal, to the specified pixel (the pixel unit 41 including the specified pixel).

For example, it is assumed that a pixel block includes 2×2 pixels 51 and the lower left pixel 51 of the 2×2 pixels 51 is set as a specified pixel, as illustrated in FIG. 20. In this case, when a pixel 51 that is disposed on the upper left in the pixel block is the pixel 51 (x, y), the pixel 51 (x, y+1) is set as the specified pixel.

The X reset signal lines $182_x$ and $182_{x+1}$ that are connected to the X reset control section 162X are connected to the input terminal of the OR gate 231X. An output from the OR gate 231X is supplied, as an X reset signal, to the pixel 51 (x, y+1) which is the specified pixel.

Also, the Y reset signal lines $192_y$ and $192_{y+1}$ that are connected to the Y reset control section 162Y are connected to the input terminal of the OR gate 231Y. An output from the OR gate 231Y is supplied, as a Y reset signal, to the pixel 51 (x, y+1) which is the specified pixel.

With the above-described configuration, when an event occurs in a pixel 51 included in a pixel block, reset signals outputted by the X reset control section 162X and the Y reset control section 162Y are supplied to the event detection pixel and the specified pixel in the pixel block. Accordingly, photoelectric current is read from the event detection pixel and the specified pixel in the pixel block.

It is to be noted that the OR gates 231X and 231Y are provided in FIG. 21, so that supply of reset signals outputted by the X reset control section 162X and the Y reset control section 162Y to the pixels 51 (the pixel units 41 including the pixels 51) is controlled by the OR gates 231X and 231Y. Alternatively, supply of such reset signals to the pixels 51 can be controlled by the X reset control section 162X and the Y reset control section 162Y without providing the OR gates 231X and 231Y.

As in the first to third reading methods, not only photoelectric current in an event detection pixel but also photoelectric current in a peripheral pixel is read. Accordingly, a situation where an unnatural image in which part of a subject is missing is obtained as an image corresponding to frame data that is generated by using a pixel signal corresponding to the photoelectric current, as in the case of the one-to-one correspondence method, can be suppressed.

<Fourth Reading Method>

Figure 22:
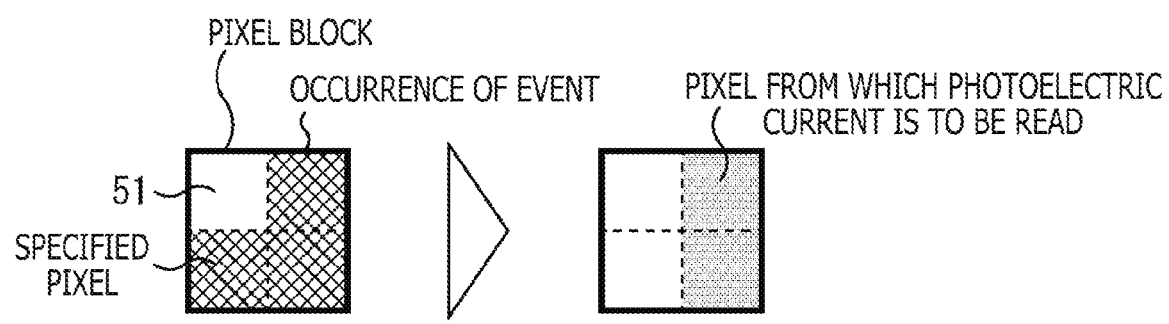
FIG. 22 is a diagram for explaining a fourth reading method.

FIG. 22 is a diagram for explaining the fourth reading method.

In the fourth reading method, the pixels 51 (the pixel units 41 including the pixels 51) constituting the pixel array section 31 are divided into blocks each including multiple pixels 51. Further, in the fourth reading method, one (at least one) pixel 51 included in the pixel block is set as a specified pixel.

In FIG. 22, for example, one pixel block includes 2×2 pixels 51, and a pixel 51 that is disposed on the lower left in the pixel block including the 2×2 pixels 51 is set as a specified pixel, as in FIG. 20.

In the fourth reading method, photoelectric current in a specified pixel is read only in a case where events are detected in all the pixels 51 constituting the pixel block. That is, in the fourth reading method, in a case where an event is not detected from at least one of the pixels 51 constituting the pixel block, photoelectric current in the specified pixel is not read.

Consequently, as an image corresponding to frame data that is generated by using a pixel signal corresponding to photoelectric current read by the fourth reading method, an image obtained by performing image processing called "Erosion" on an image corresponding to frame data that is generated by using a pixel signal corresponding to photoelectric current in an event detection pixel is obtained.

In the one-to-one correspondence method, for example, when slight movement occurs in a background, an unintended event (hereinafter, also referred to as a fake event) may be detected, so that photoelectric current may be read from a pixel 51 where the fake event has been detected.

In the fourth reading method, photoelectric current in a specified pixel is not read unless events in all the pixels 51 constituting a pixel block are detected. Therefore, useless reading of photoelectric current from a specified pixel due to a fake event can be suppressed.

FIG. 23 is a diagram depicting a configuration example of the sensor section 21 in the case where the fourth reading method is adopted.

It is to be noted that illustration of the output section 34 is omitted in FIG. 23.

In FIG. 23, the sensor section 21 includes the pixel array section 31, the EMX arbiter 151X and the EMY arbiter 151Y which constitute the EM arbiter 32, and the TDX arbiter 161X, the TDY arbiter 161Y, the X reset control section 162X, and the Y reset control section 162Y which constitute the TD arbiter 33.

Further, the sensor section 21 includes a plurality of AND gates 241X and a plurality of AND gates 241Y.

The AND gates 241X and 241Y are provided for each specified pixel (each pixel unit 41 including a specified pixel).

The X reset signal lines 182 that are connected to the pixels 51 in a pixel block including a specified pixel (a pixel unit 41 of a specified pixel) are connected to an input terminal of the AND gate 241X.

An output from the AND gate 241X is supplied, as an X reset signal, to the specified pixel (the pixel unit 41 including the specified pixel).

In a similar way, the Y reset signal lines 192 that are connected to the pixels 51 in a pixel block including a specified pixel (a pixel unit 41 including a specified pixel) are connected to an input terminal of the AND gate 241Y.

An output from the AND gate 241Y is supplied, as a Y reset signal, to the specified pixel (the pixel unit 41 including the specified pixel).

For example, it is assumed that a pixel block includes 2×2 pixels 51, and the lower left pixel 51 of the 2×2 pixels 51 is set as a specified pixel, as illustrated in FIG. 22. In this case, when the pixel 51 that is disposed on the upper left in the pixel block is the pixel 51 (x, y), the pixel 51 (x, y+1) is set as a specified pixel.

The X reset signal lines $182_x$ and $182_{x+1}$ that are connected to the X reset control section 162X are connected to the input terminal of the AND gate 241X. An output from the AND gate 241X is supplied, as an X reset signal, to the pixel 51 (x, y+1) which is the specified pixel.

Also, the Y reset signal lines $192_y$ and $192_{y+1}$ that are connected to the Y reset control section 162Y are connected to the input terminal of the AND gate 241Y. An output from the AND gate 241Y is supplied, as a Y reset signal, to the pixel 51 (x, y+1) which is the specified pixel.

With the above-described configuration, even when an event occurs in a pixel 51 included in a pixel block, reset signals (the X reset signal and the Y reset signal) are not supplied to the specified pixel in the pixel block unless events occur in all the pixels 51 included in the pixel block, so that photoelectric current is not read from the specified pixel.

That is, only in the case where events occur in all the pixels 51 included in the pixel block, the reset signals (the X reset signal and the Y reset signal) are supplied to the specified pixel in the pixel block, and photoelectric current in the specified pixel is read.

It is to be noted that the AND gates 241X and 241Y are provided in FIG. 23, so that supply of reset signals outputted by the X reset control section 162X and the Y reset control section 162Y to the pixels 51 (the pixel units 41 including the pixels 51) is controlled by the AND gates 241X and 241Y. Alternatively, supply of such reset signals to the pixels 51 can be controlled by the X reset control section 162X and the Y reset control section 162Y without providing the AND gates 241X and 241Y.

<Examples of Application to Mobile Body>

The technology (present technology) according to the present disclosure is applicable to various products. For example, the technology according to the present disclosure may be realized as a device which is mounted on a mobile body of any type such as an automobile, an electric automobile, a hybrid electric automobile, a motorcycle, a bicycle, a personal mobility, an aircraft, a drone, a ship, or a robot.

Figure 24:
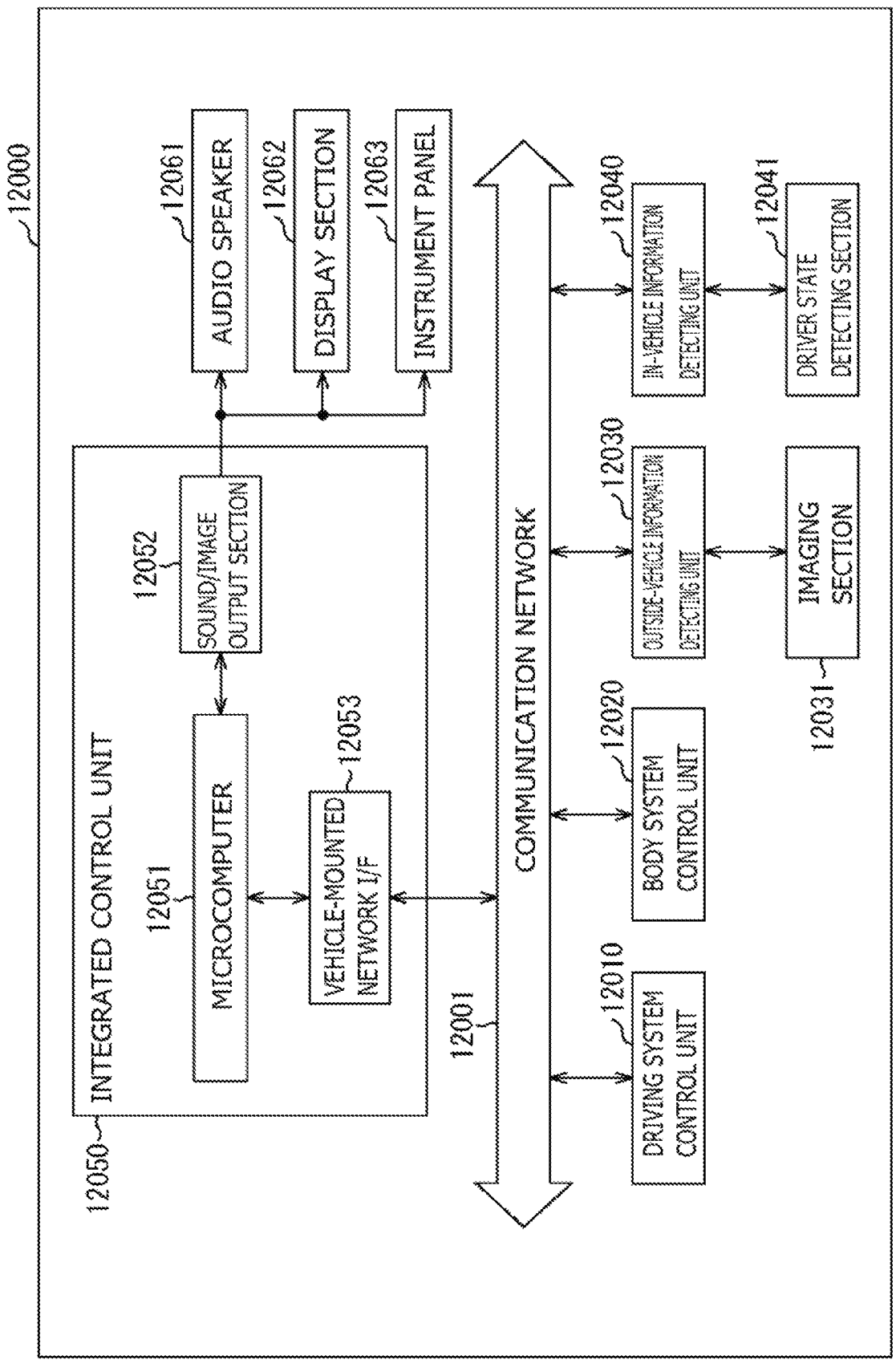
FIG. 24 is a block diagram depicting an example of schematic configuration of a vehicle control system.

FIG. 24 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 24, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 24, an audio speaker 12061, a display section 12062, and an instrument panel 12063 are illustrated as the output device. The display section 12062 may, for example, include at least one of an on-board display and a head-up display.

Figure 25:
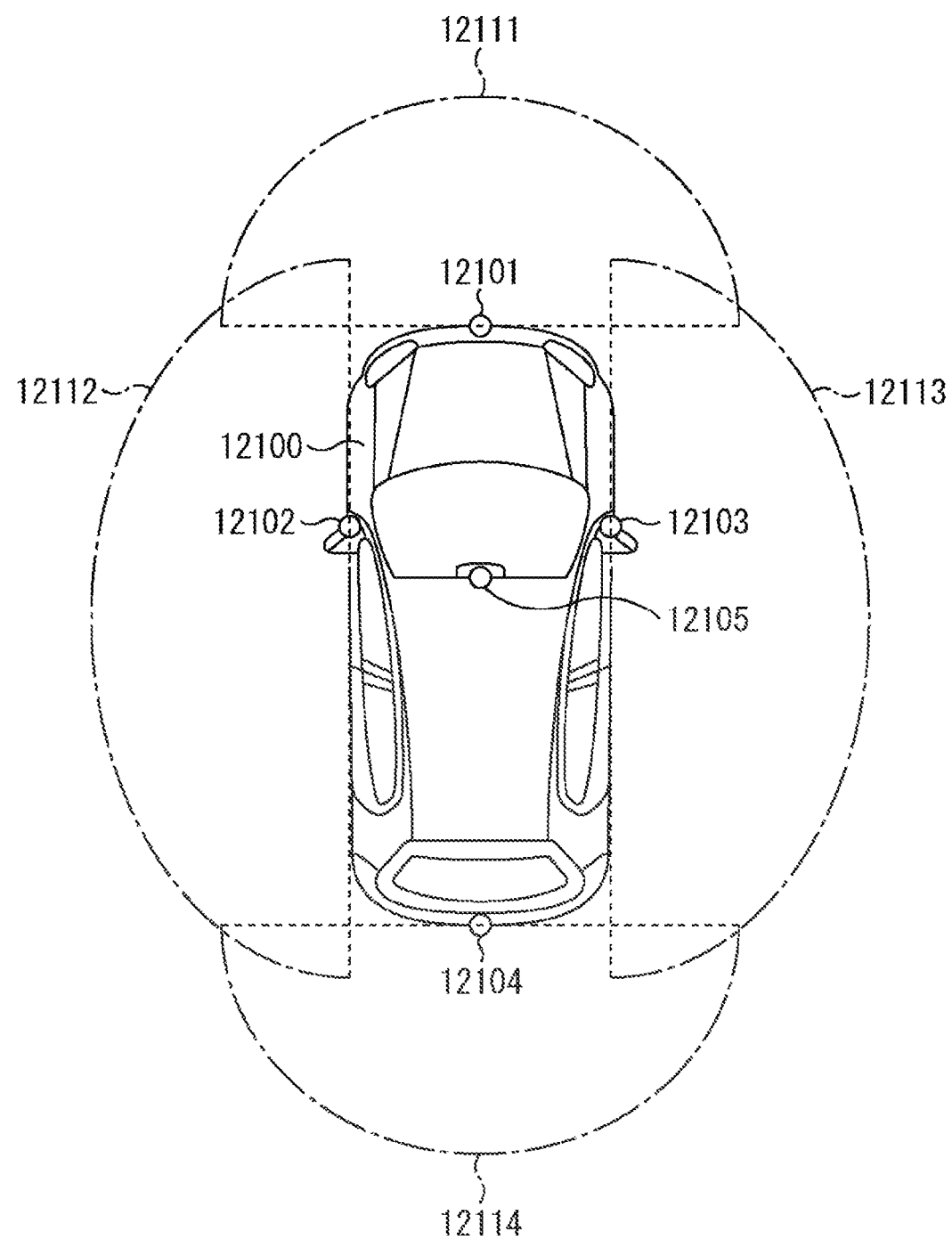
FIG. 25 is a diagram of assistance in explaining an example of installation positions of an outside-vehicle information detecting section and an imaging section.

FIG. 25 is a diagram depicting an example of the installation position of the imaging section 12031.

In FIG. 25, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 25 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

One example of a vehicle control system to which the technology according to the present disclosure is applicable has been explained above. The technology according to the present disclosure is applicable to the imaging section 12031 among the above-described components. Specifically, the sensor chip in FIG. 1 can be applied to the imaging section 12031. When the technology according to the present disclosure is applied to the imaging section 12031, a situation where an unnatural image is obtained can be suppressed. Accordingly, driving support can be properly implemented.

<Another Configuration Example of TD Section (Event Detection Section) 52>

Figure 26:
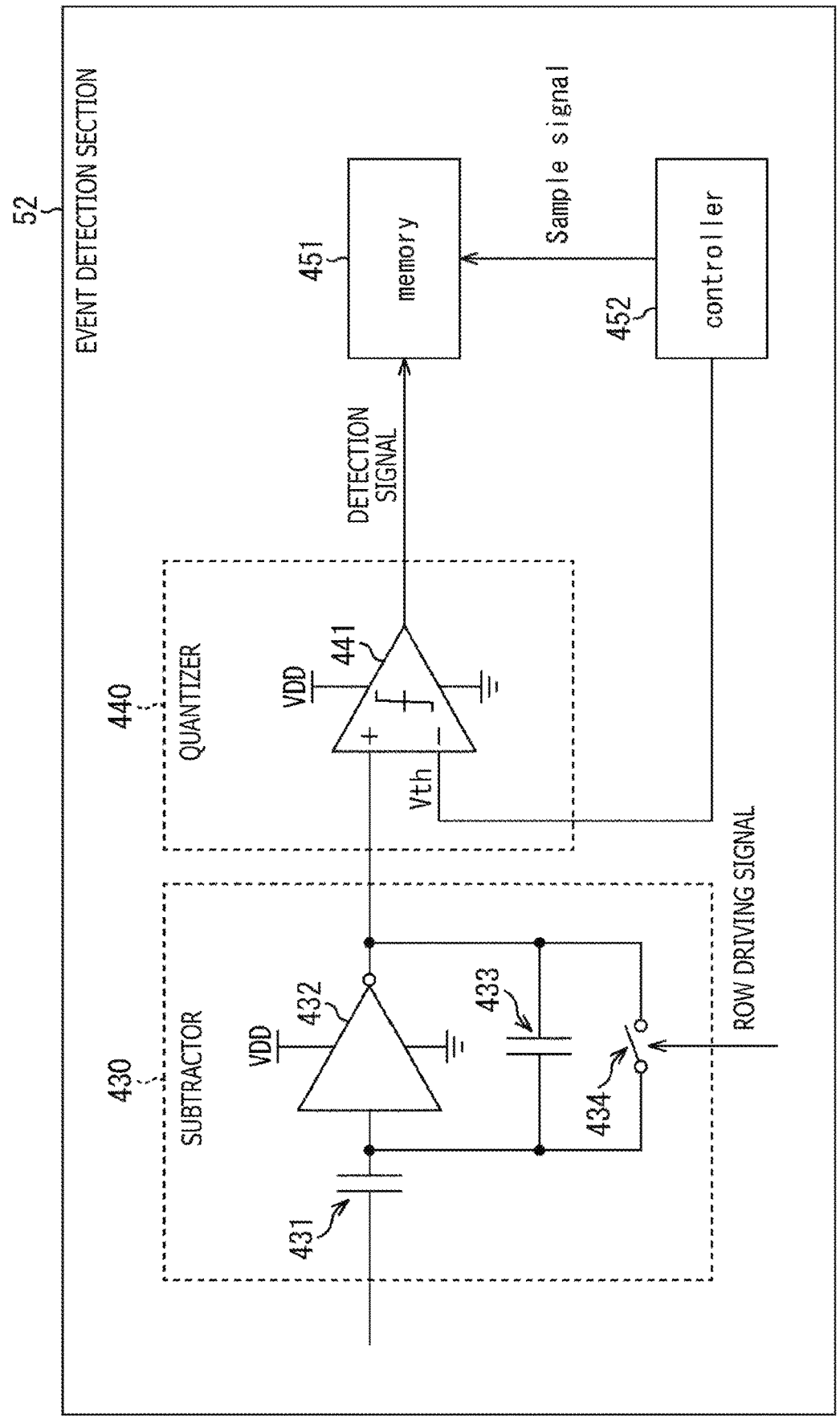
FIG. 26 is a diagram depicting another configuration example of the TD section (event detection section) 52.

FIG. 26 is a diagram depicting another configuration example of the TD section (event detection section) 52.

In FIG. 26, the TD section 52 includes a subtractor 430, a quantizer 440, a memory 451, and a controller 452. The subtractor 430 and the quantizer 440 correspond to the subtraction section 83 and the quantization section 84, respectively.

It is to be noted that the TD section 52 in FIG. 26 further includes blocks corresponding to the current-voltage conversion section 81 and the buffer 82, but illustration thereof is omitted in FIG. 26.

The subtractor 430 includes a capacitor 431, an operational amplifier 432, a capacitor 433, and a switch 434. The capacitor 431 to the switch 434 correspond to the capacitor 101 to the switch 104, respectively.

The quantizer 440 includes a comparator 441. The comparator 441 corresponds to the comparator 111.

The comparator 441 compares a voltage signal (difference signal) from the subtractor 430 with a prescribed threshold voltage Vth applied to an inverted input terminal (−) thereof. The comparator 441 outputs, as a detection signal (quantization value), a signal indicating the comparison result.

The voltage signal from the subtractor 430 may be inputted to the input terminal (−) of the comparator 441, and the prescribed threshold voltage Vth may be inputted to an input terminal (+) of the comparator 441.

The controller 452 supplies the prescribed threshold voltage Vth to be applied to the inverted input terminal (−) of the comparator 441. The threshold voltage Vth to be supplied may have a voltage value that varies in a time division manner. For example, the controller 452 supplies a threshold voltage Vth1 corresponding to an ON event (e.g., a positive change of photoelectric current) and a threshold voltage Vth2 corresponding to an OFF event (e.g., a negative change of photoelectric current) at different timings, so that a plurality of types of address events (events) can be detected by one comparator.

The memory 451 accumulates outputs from the comparator 441 on the basis of Sample signals supplied from the controller 452. The memory 451 may be a sampling circuit such as a switch, a plastic, or a capacitance, or may be a digital memory circuit such as a latch or a flip flop. For example, during a time period in which the threshold voltage Vth2 corresponding to an OFF event is being supplied to the inverted input terminal (−) of the comparator 441, the memory 451 may hold a comparison result obtained by the comparator 441 using the threshold voltage Vth1 corresponding to an ON event. It is to be noted that the memory 451 may be omitted, may be disposed inside a pixel (a pixel unit 41), or may be disposed outside a pixel.

<Scan System>

The sensor chip 10 in FIG. 1 is an asynchronous imaging device that reads an event by an asynchronous reading method. However, the event reading method is not limited to asynchronous reading methods, and a synchronous reading method may be adopted. An imaging device employing a synchronous reading method is an image device of a scan system which is the same as normal imaging devices that perform imaging at prescribed frame rates.

Figure 27:
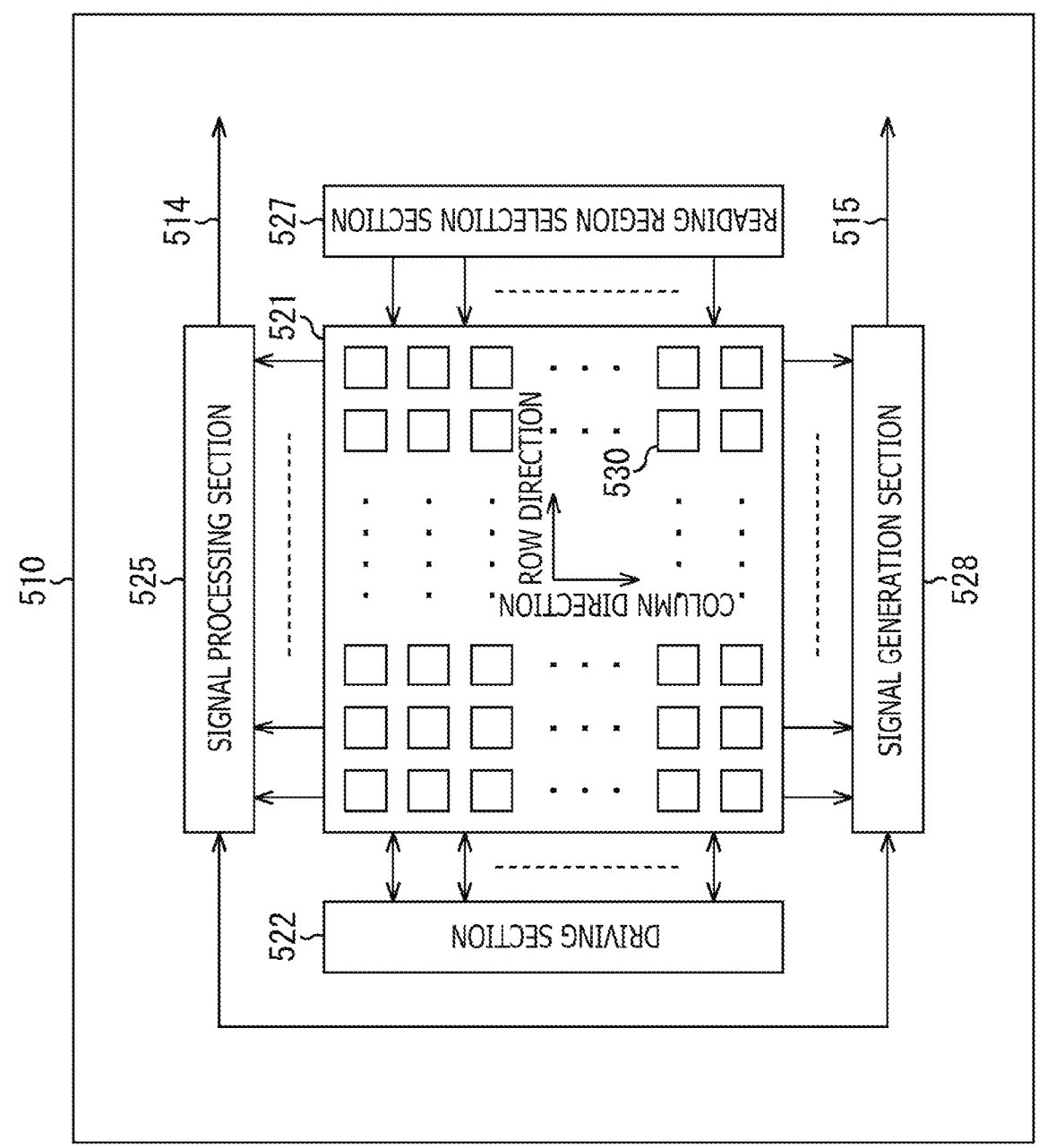
FIG. 27 is a block diagram depicting a configuration example of a scan-system imaging device.

FIG. 27 is a block diagram depicting a configuration example of a scan-system imaging device.

As depicted in FIG. 27, an imaging device 510 includes a pixel array section 521, a driving section 522, a signal processing section 525, a reading region selection section 527, and a signal generation section 528.

The pixel array section 521 includes a plurality of pixels 530. Each of the plurality of pixels 530 outputs an output signal in response to a selection signal from the reading region selection section 527. The plurality of pixels 530 may have respective quantizers inside the pixels, as depicted in FIG. 26, for example. Each of the plurality of pixels 530 outputs an output signal corresponding to a light-intensity change amount. The plurality of pixels 530 may be two-dimensionally arranged into a matrix form, as depicted in FIG. 27.

The driving section 522 drives each of the plurality of pixels 530 to cause the signal processing section 525 to output pixel signals generated by the respective pixels 530 through an output line 514. It is to be noted that the driving section 522 and the signal processing section 525 are circuit sections for acquiring gradation information. Therefore, in the case of acquiring event information (event data) only, the driving section 522 and the signal processing section 525 may be omitted.

The reading region selection section 527 selects some of the plurality of pixels 530 included in the pixel array section 521. For example, the reading region selection section 527 selects any one or more of rows included in the two-dimensional matrix structure corresponding to the pixel array section 521. The reading region selection section 527 sequentially selects one or more rows at a preset cycle. In addition, the reading region selection section 527 may decide a selection region in response to a request from each of the pixels 530 in the pixel array section 521.

On the basis of output signals of the pixels 530 selected by the reading region selection section 527, the signal generation section 528 generates an event signal (event data) corresponding to an active pixel, among the selected pixels 530, where an event has been detected. The event is a light intensity change. The active pixel is a pixel 530 where the light-intensity change amount corresponding to the output signal is greater than a preset threshold or lower than the preset threshold. For example, the signal generation section 528 compares output signals from the pixels 530 with a reference signal, detects an active pixel having outputted an output signal that is higher or lower than the reference signal, and generates an event signal corresponding to the active pixel.

The signal generation section 528 can include a column selection circuit to arbitrate signals inputted to the signal generation section 528, for example. In addition, the signal generation section 528 can output information regarding a non-active pixel where an event has not been detected, in addition to information regarding an active pixel where an event has been detected.

Address information and time stamp information (e.g., (X, Y, T)) regarding an active pixel where an event has been detected are outputted from the signal generation section 528 via an output line 515. However, besides the address information and time stamp information, frame-type information (e.g., (0, 0, 1, 0, . . . )) may be outputted from the signal generation section 528.

It is to be noted that the embodiment of the present technology is not limited to the above-described embodiments, and various changes can be made within the scope of the gist of the present technology.

Moreover, the effects described in the present specification are mere examples, and thus, are not limitative. Any other effects may be provided.

REFERENCE SIGNS LIST

10: Sensor chip
11: Sensor die

12: Logic die
21: Sensor section
22: Logic section
31: Pixel array section
32: EM arbiter
33: TD arbiter
34: Output section
41: Pixel unit
51: Pixel
52: TD section
53: EM section
61, 62: PD
71: Capacitor
72: FET
73: Switch
74: Comparator
81: Current-voltage conversion section
82: Buffer
83: Subtraction section
84: Quantization section
85: Transfer section
91 to 93: Transistor
101: Capacitor
102: Operational amplifier
103: Capacitor
104: Switch
111: Comparator
151X: EMX arbiter
151Y: EMY arbiter
161X: TDX arbiter
161Y: TDY arbiter
162X: X reset control section
162Y: Y reset control section
181: TDX request signal line
182: X reset signal line
183: EMX request signal line
191: TDY request signal line
192: Y reset signal line
193: EMY request signal line
211X, 211Y, 221X, 221Y, 231X, 231Y: OR gate
241X, 241Y: AND gate

The invention claimed is:

1. A sensor, comprising:
a first plurality of pixels, wherein each of the first plurality of pixels is configured to receive light and perform photoelectric conversion to generate an electric signal; and
circuitry configured to:
detect an event that corresponds to a change of the electric signal of a pixel of the first plurality of pixels;
the electric signal of the pixel based on a voltage change in a capacitance of the pixel, wherein
the capacitance is reset to a specific voltage based on the detected event, and
the voltage change in the capacitance is based on the electric signal of the pixel;
read an electric signal of an event detection pixel of the first plurality of pixels; and
read an electric signal of at least one peripheral pixel of the first plurality of pixels, wherein
the event detection pixel corresponds to the pixel where the event has been detected, and
the at least one peripheral pixel is in a periphery of the event detection pixel.

2. The sensor according to claim 1, wherein the circuitry is further configured to:
reset a capacitance of the event detection pixel,
reset a capacitance of the at least one peripheral pixel,
read the electric signal of the event detection pixel based on the reset capacitance, and
read the electric signal of the at least one peripheral pixel based on the reset capacitance.

3. The sensor according to claim 2, wherein the circuitry is further configured to:
read the electric signal of each of a second plurality of pixels of the first plurality of pixels, wherein
the second plurality of pixels is in a block, and
the event is detected in one of the second plurality of pixels in the block.

4. The sensor according to claim 3, wherein
based on detection of an event in one of the second plurality of pixels in the block the circuitry is further configured to reset the capacitance of each of the second plurality of pixels in the block.

5. The sensor according to claim 2, wherein the circuitry is further configured to:
read the electric signal of a second plurality of pixels of the first plurality of pixels, wherein each of the second plurality of pixels is in a specific range that is centered at the event detection pixel.

6. The sensor according to claim 5, wherein the circuitry is further configured to reset capacitances of each of the second plurality of pixels.

7. The sensor according to claim 2, wherein the circuitry is further configured to:
read the electric signal of a specific pixel, wherein
the event detection pixel and the specific pixel are in a block, and
the block includes a second plurality of pixels of the first plurality of pixels.

8. The sensor according to claim 7, wherein the circuitry is further configured to:
reset the capacitance of the event detection pixel and the capacitance of the specific pixel, wherein
the event is detected in one of the second plurality of pixels in the block.

9. A control method, comprising:
by a sensor that includes a plurality of pixels:
receiving light by each of a plurality of pixels of the sensor,
performing photoelectric conversion, by each of the plurality of pixels of the sensor, to generate an electric signal,
detecting an event that corresponds to a change of the electric signal of a pixel of the plurality of pixels,
reading the electric signal of a pixel based on a voltage change in a capacitance of the pixel, wherein
the capacitance is reset to a specific voltage based on the detected event, and
the voltage change in the capacitance is based on the electric signal of the pixel,
reading an electric signal of an event detection pixel of the plurality of pixels; and
reading an electric signal of at least one peripheral pixel of the plurality of pixels, wherein
the event detection pixel corresponds to the pixel where the event has been detected, and
the at least one peripheral pixel is in a periphery of the event detection pixel.

* * * * *